United States Patent [19]

Kadowaki et al.

[11] 4,272,815

[45] Jun. 9, 1981

[54] CHANNEL CONTROL SYSTEM FOR CONTROLLING DATA TRANSFER THROUGH A PLURALITY OF CHANNELS WITH PRIORITY ASSIGNMENT

[75] Inventors: Yoshihiko Kadowaki; Hiroya Okuda; Takashi Morikawa, all of Hadano, Japan

[73] Assignee: Hitachi, Ltd., Tokyo, Japan

[21] Appl. No.: 3,092

[22] Filed: Jan. 12, 1979

[30] Foreign Application Priority Data

Jan. 20, 1978 [JP] Japan .................................. 53-4381

[51] Int. Cl.³ .............................................. G06F 3/00
[52] U.S. Cl. .................................................. 364/200
[58] Field of Search ... 364/200 MS File, 900 MS File

[56] References Cited

U.S. PATENT DOCUMENTS

| 3,283,306 | 11/1966 | Patrusky | 364/200 |
| 4,056,843 | 11/1977 | Bishop et al. | 364/200 |
| 4,115,854 | 9/1978 | Capowski et al. | 364/200 |

FOREIGN PATENT DOCUMENTS

1057085  2/1967 United Kingdom .

*Primary Examiner*—Raulfe B. Zache
*Attorney, Agent, or Firm*—Craig and Antonelli

[57] ABSTRACT

Disclosed is a channel control system for controlling data transfers between a main storage and input/output devices. A plurality of channels are controlled by a common controller. The controller divides the processing for data transfer requests into a plurality of processing stages to allow the corresponding number of the channels to be controlled simultaneously by executing the processing for different channels separately at the divided individual processing stages.

5 Claims, 30 Drawing Figures

F I G. 3
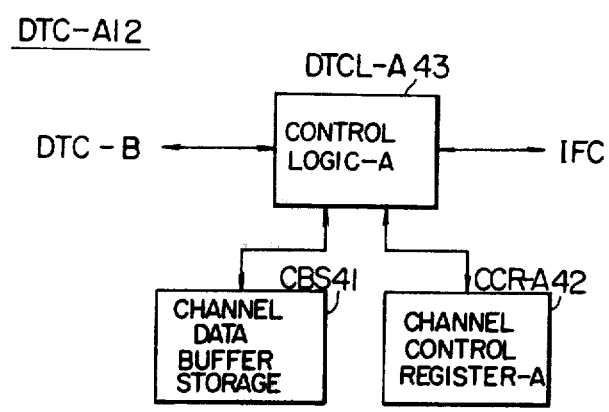
F I G. 4
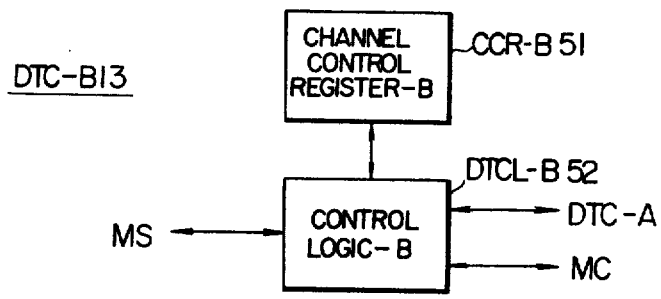

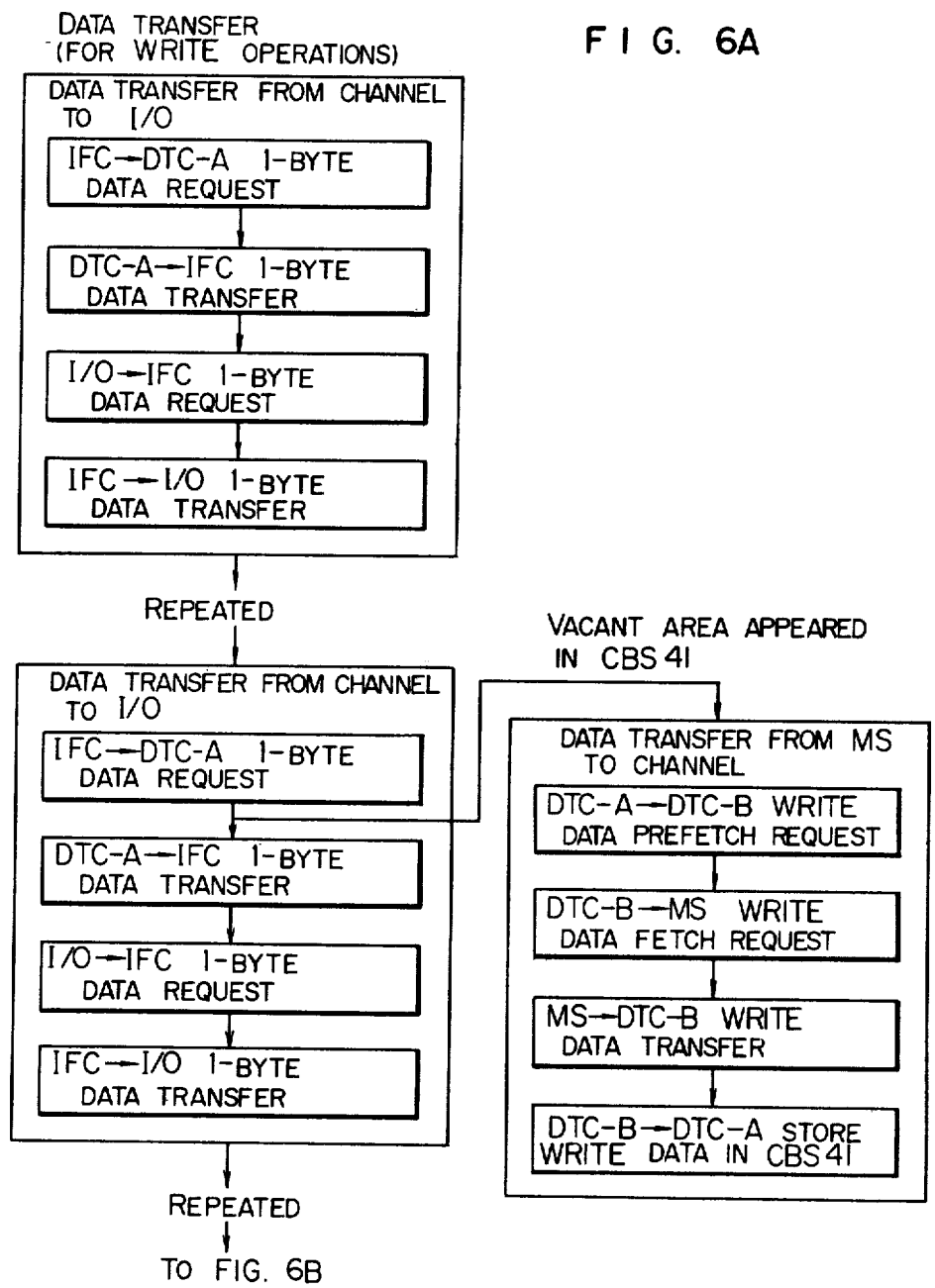

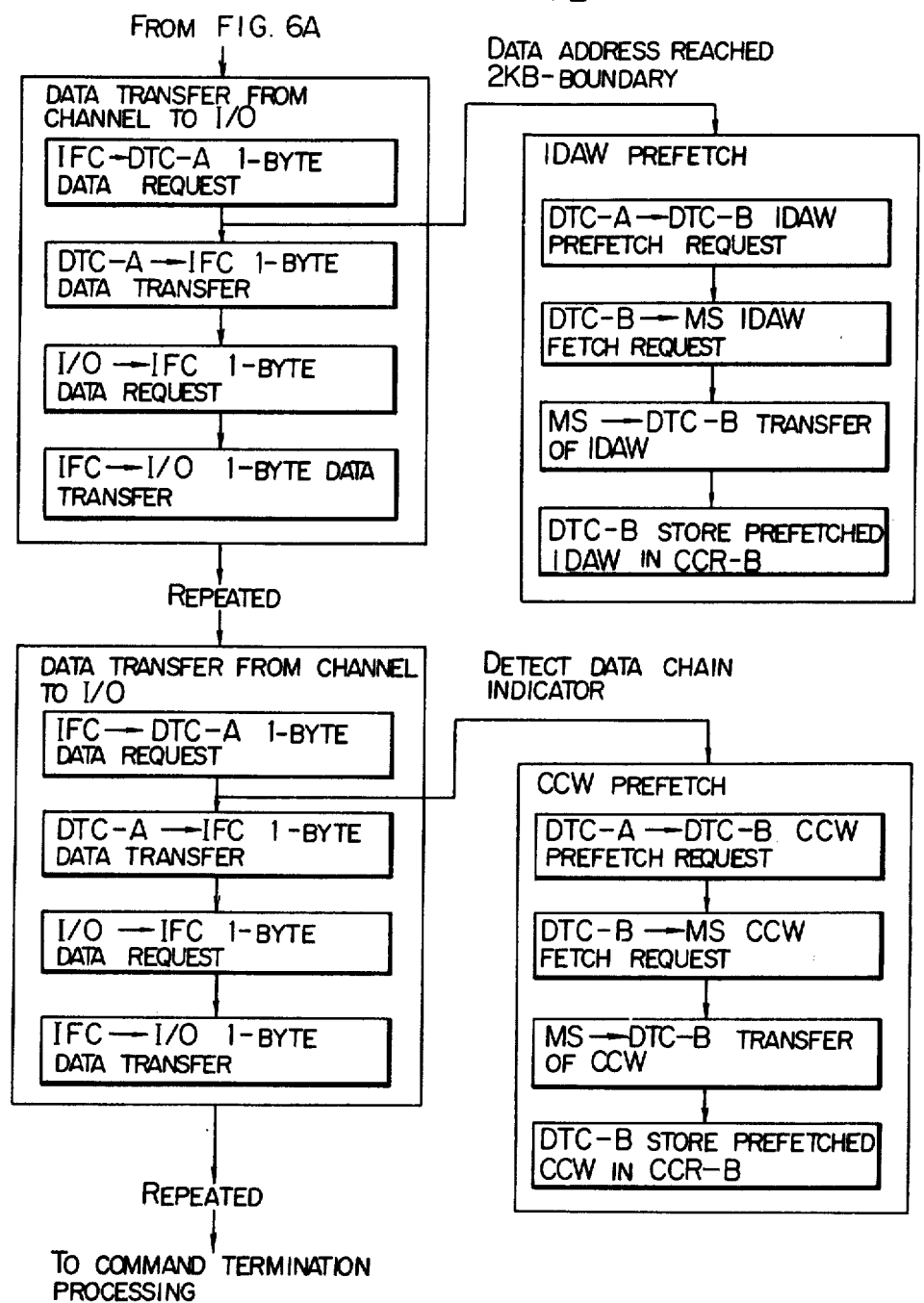

FIG. 11

|   | 0 | 1 | 2 | 3 |
|---|---|---|---|---|
| 0 | UNUSED | USQC | NIQR | BIQR |
| 1 | KEY \| 00 \| DCC | | NEXT CCW ADDRESS | |
| 2 | DSB | CSB | DATA COUNT | |

FIG. 12

|   | 0 | 1 | 2 | 3 |
|---|---|---|---|---|
| 0 | KEY | UNUSED | NEXT CCW ADDRESS | |
| 1 | FLAG | | CSB | DATA COUNT |
| 2 | KEY | UNUSED | NEXT IDAW/NEXT CCW ADR+8 | |
| 3 | PF FLAG | | PF CSB | PF DATA COUNT |
| 4 | KEY | UNUSED | DATA ADDRESS | |
| 5 | UNUSED | | NEXT IDAW ADDRESS | |

FIG. 13

|   | 0 | 1 | 2 | 3 |
|---|---|---|---|---|
| 0 | CIDA \| IDA \| SKIP \| NIDAWW \| CADRW \| DADRW \| FNIDAW \| 0 \| SRF0 \| SRF1 \| DR0 \| DR1 \| CF0 \| CF1 \| CF2 \| 0 | | SP | LP |
| 1 | 0----0 \| LDT \| COM | CP | | DATA COUNT |

F I G. 22
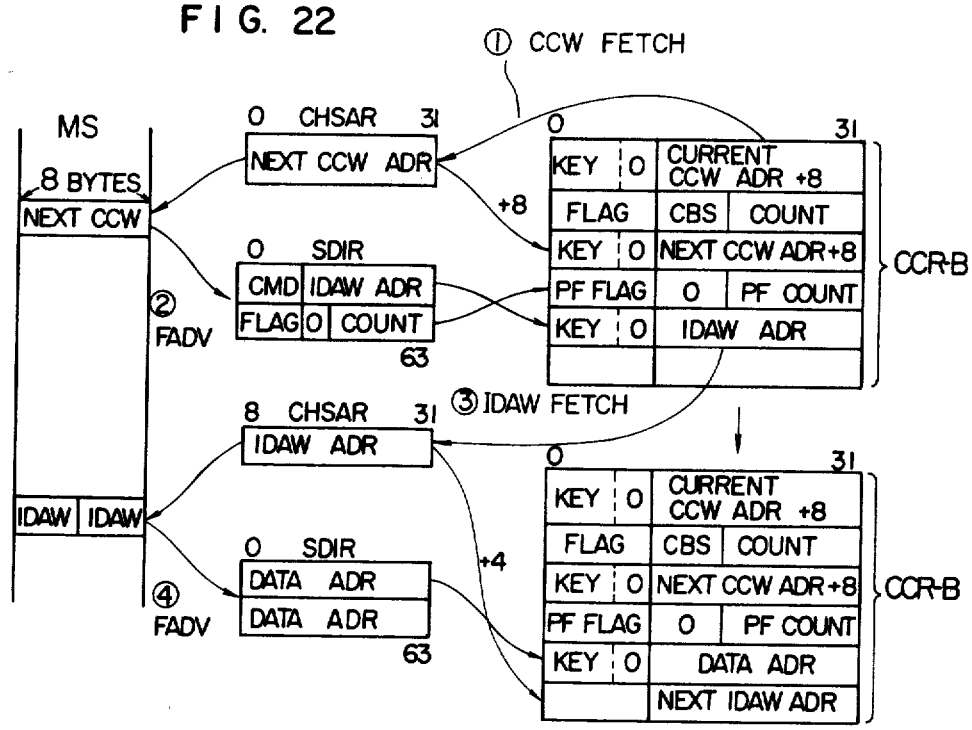
F I G. 23
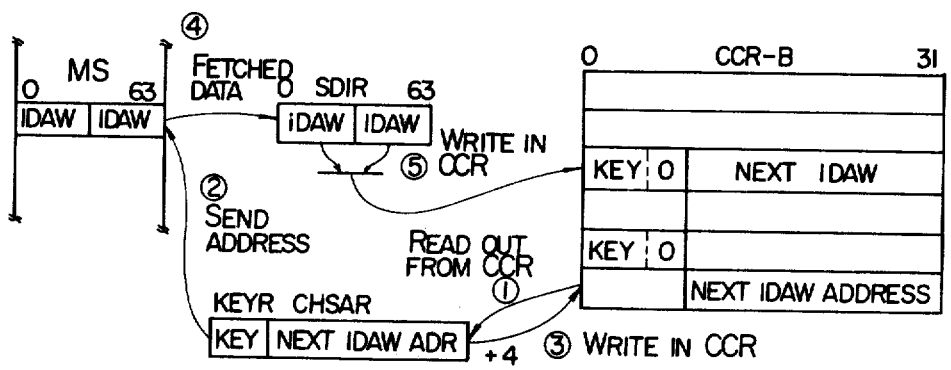

CHANNEL CONTROL SYSTEM FOR CONTROLLING DATA TRANSFER THROUGH A PLURALITY OF CHANNELS WITH PRIORITY ASSIGNMENT

CROSS-REFERENCES TO RELATED APPLICATIONS

The present application relates to U.S. patent applications Ser. No. 003,920 entitled "Channel Control System" and Ser. No. 003,960 entitled "Channel Control System of a Sequential Control Type" by Yoshihiko Kadowaki, Hiroya Okuda and Takashi Morikawa, filed January 16, 1979, and assigned to the assignee of the present application, based on Japanese Patent Application No. 53-4381 filed on Jan. 20, 1978.

The present invention relates to a channel control system for controlling a plurality of selector channels (SELs) and block multiplexer channels (BLMPSs) in a multiplex manner.

A channel unit of the common control type for controlling a plurality of channels in a multiplex manner through control circuits provided in common for the channels, such as a circuit for controlling initiation of a command, a circuit for controlling termination of the command, a circuit for controlling data transfer and so forth, is disclosed, for example, in the specification of U.S. Pat. No. 4,056,843 issued to Bishop et al under the title "DATA PROCESSING SYSTEM HAVING A PLURALITY OF CHANNEL PROCESSORS".

The channel unit of the common control type comprises a microprogram controller (MC), a data transfer controller (DTC), and input/output (I/O) interface controllers (IFCs). These controllers MC, DTC and IFC can be operated independently from one another. The controllers MC and DTC are used in common by a plurality of channels, while IFC is individually provided for each channel. Principal channel control functions are shared or allotted among these controllers in the manner mentioned below. The MC serves for interface control between channels and a central processing unit (CPU) for processing initiation of an input/output instruction (I/O instruction) and input/output (I/O) interruption, interface control between channels and a main storage (MS), control for initiation and termination of a command, command chain control, data chain control, indirect data address (IDA) control and so forth. The controller DTC is adapted to control the transfer of data between the channels and the input/output devices I/O on one-byte basis, while the IFC performs I/O interface controls required for initiating and terminating commands and data transfer. In this manner, the data transfer control which takes place at a relatively high frequency is executed by a DTC controller implemented in a hardware configuration and exhibiting a high response, while the execution of rather complicated processing which takes place at a relatively low frequency is controlled by the MC.

Functions of the channel system may be generally classified into four major controls as follows:

(i) I/O interface control, (ii) control of data transfer between channels and I/O devices, (iii) controls which have to be conducted concurrently with the data transfer control between channels and I/O devices and for which a high-speed processing is required, such as data chain control, data transfer control for channel and MS, and IDA control, and (iv) controls which are not required concurrently with the control for data transfer between channels and I/O devices or can be processed at a relatively low speed, such as control for initiation and termination of commands, command chain control, interruption control and so forth.

In connection with the control defined above in paragraph (iii), this control represents control or processing which takes place in the course of executing data transfer between a channel and an I/O device in response to an issued command and encompasses that control which involves a change or modification of an address in the course of the execution of data transfer, such as data chain control, and IDA control which are adapted to transfer continuous data to different and discrete regions or locations of the MS.

Although it is stated that a plurality of channels are controlled in common, the number of channels to be controlled at a time is one. It is noted that an increase in the number of channels to be controlled in common as an well as enhanced operation speed of the I/O devices represent an insufficiently of or inadequacy in the performances of the conventional channel control system as a whole.

An object of the present invention is to provide a channel control system which allows a plurality of channels to be controlled concurrently.

A channel control system according to the present invention comprises a channel data buffer storage means for storing data to be transferred in a corresponding relation to each of the channels and a channel control register means for storing data transfer control information in a corresponding relation to each of the channels. One of the data transfer requests for a plurality of channels is selectively accepted by a request selection means, in accordance with a predetermined priority order, for example. The data transfer requests as accepted are supplied sequentially to a stage control means which is adapted to divide the processing for the accepted data transfer request into a plurality of processing stages, each of which is adapted to execute the processing for a different channel. In dependence on respective stage output signals from the stage control means, read-out and write-in operations to the channel data buffer storage and the channel control register are performed.

With the arrangement of the invention, it is possible to process simultaneously the same number of data transfers as that of the processing stages.

This invention will be better understood from the following description on preferred embodiments thereof taken in conjunction with the accompanying drawings, in which:

FIG. 3 is a block diagram showing an arrangement of a data transfer controller (DTC-A) shown in FIG. 1;

FIG. 4 is a block diagram to show an arrangement of a data transfer controller (DTC-B) shown in FIG. 1;

FIGS. 5 to 7 are to illustrate outline of channel operations according to this invention, in which FIG. 5 is a flow chart to illustrate processing of command start, FIGS. 6A and 6B in combination show a flow chart illustrating data transfer processing, and FIG. 7 show a flow chart illustrating command termination processing;

FIG. 11 shows a format of a sub-channel register (SBCR) shown in FIG. 2;

FIG. 12 shows a format of a channel control register (CCR-B) shown in FIG. 4;

FIG. 13 shows a format of a channel control register (CCR-A) shown in FIG. 3;

FIG. 22 illustrates flow of IDA control for processing a data chain of type of "WRITE" operations;

FIG. 23 illustrates processing for fetching Next IDAW;

Figure 1:
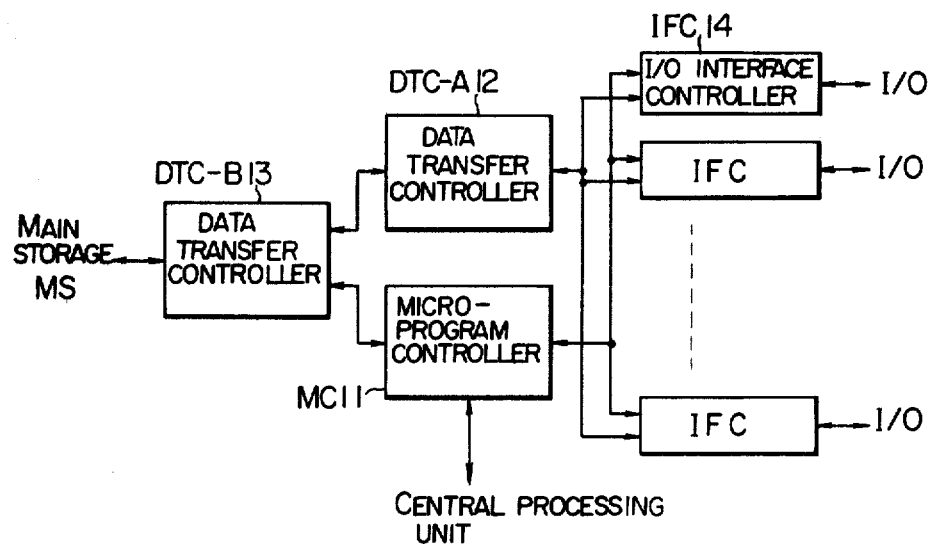
FIG. 1 is a schematic block diagram showing an exemplary embodiment of this invention.

Now, referring to FIG. 1 which shows in a block diagram a channel control system according to an embodiment of this invention, the system comprises a microprogram controller (MC) 11 which is adapted to execute various processings, such as initiation processing of commands, termination processing of the commands and processing command chain processing to a plurality of channels, and interruption processing to a central processing unit (CPU). Further, the channel control system includes a data transfer controller (DTC-A) 12 for executing the transfer of data between a main storage (MS) and a plurality of channels by controlling a plurality of data buffers provided for the channels, a second data transfer controller (DTC-B) 13 for executing data transfer control, data chain control and indirect address control, and input/output interface control units (IFC) 14 provided correspondingly for each channel.

Figure 2:
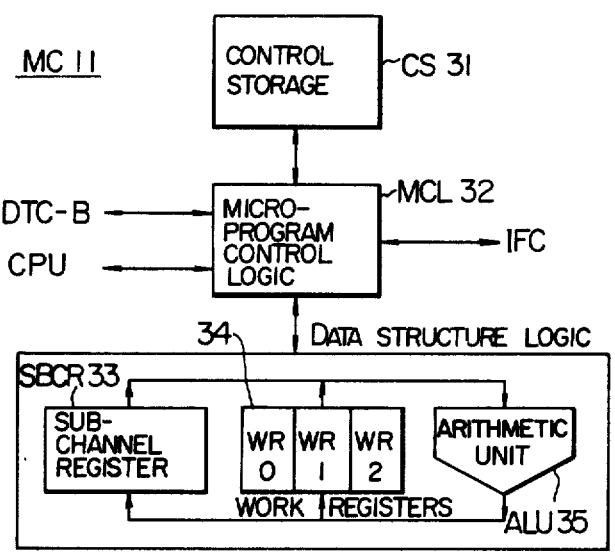
FIG. 2 is a block diagram showing in detail an arrangement of a microprogram controller (MC) shown in FIG. 1.

FIG. 2 shows a block diagram of the microprogram controller MC 11, FIG. 3 shows a block diagram of the first data transfer controller DTC-A 12, and FIG. 4 shows a block diagram of the second data transfer controller DTC-B 13.

Referring to FIG. 2, the microprogram controller MC11 comprises a control storage (CS) 31 for storing microprograms, a microprogram control logic (MCL) 32 for reading out microprograms sequentially from the control storage CS 31 for the execution thereof, a sub-channel register (SBCR) 33 for storing control information at corresponding I/O (INPUT/OUTPUT) addresses, a group of work registers (WRs) 34 which are used for the execution of a microprogram and an arithmetic unit (ALU) 35 for performing arithmetic operations required when the microprogram is executed.

Referring to FIG. 3, reference numeral 41 denotes a channel data buffer storage (CBS) provided for each of the channels or IFCs 14, 42 denotes a channel control register (CCR-A) for storing therein data transfer control information, and 43 denotes a control logic (DTCL-A) for controlling the operations of DTC-A.

In FIG. 4, numeral 51 denotes a channel control register (CCR-B) for storing the data transfer control information, and 52 denotes a control logic (DTCL-B) for controlling the operations of DTC-B.

Figure 5:
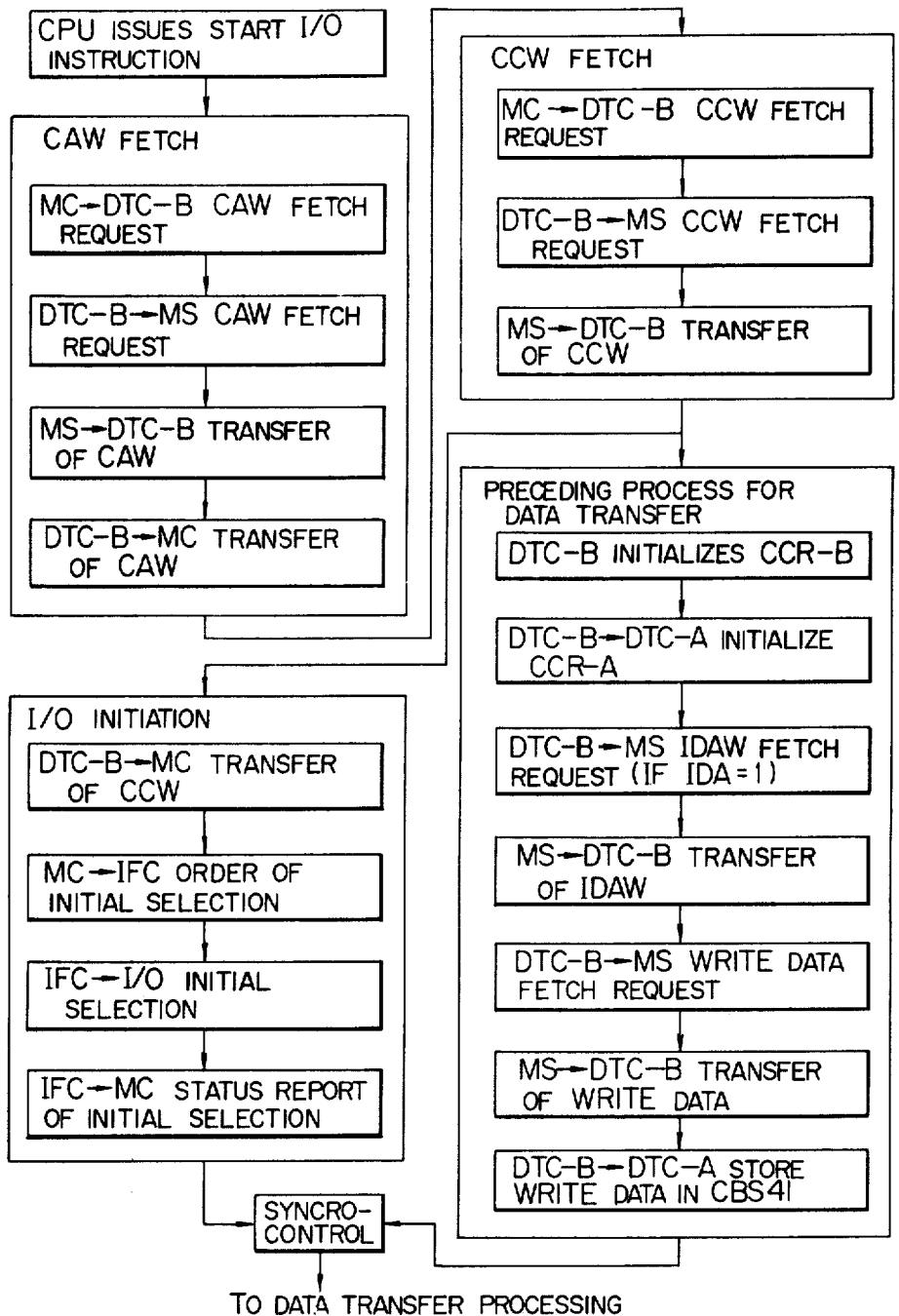
Figure 7:
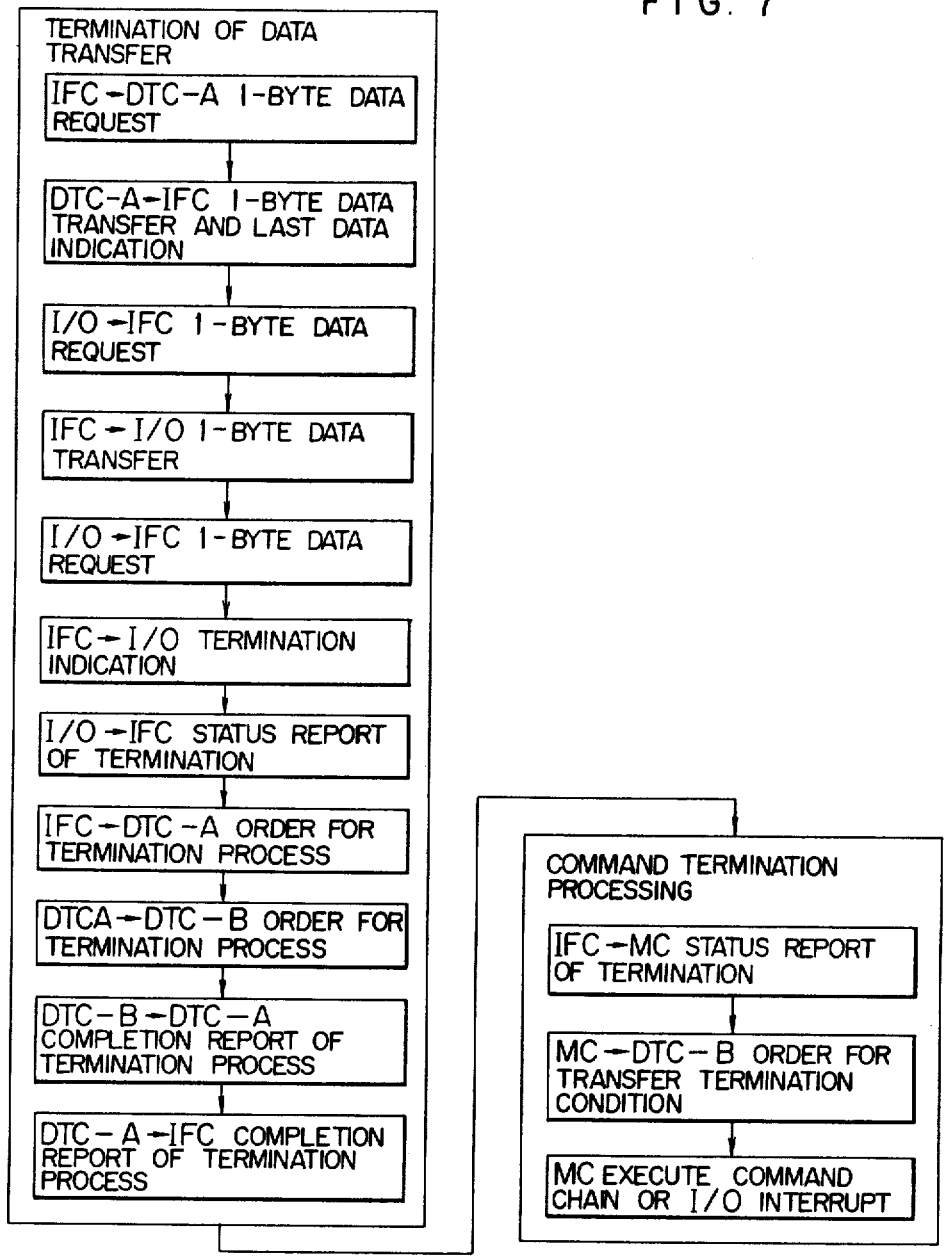

FIGS. 5 to 7 show flow charts for illustrating briefly the operations of the channel control system according to the invention. More particularly, the processing of a command initiation is illustrated in the flow chart shown in FIG. 5, the routine for executing data transfer is illustrated in the flow charts of FIGS. 6A and 6B, and the routine for processing the termination of a command is illustrated in the flow chart of FIG. 7.

Describing briefly the channel control operations with the aid of the flow charts shown in FIGS. 5 to 7, it is assumed that the instruction START I/O is issued in the central processing unit CPU as shown in FIG. 5. Then, a start indication START I/O is fed to MC 11 from the CPU together with encoded numbers identifying the associated channel and input/output device I/O. In response to the start indication, MC 11 transmits a request to DTC-B 13 for reading out the channel address word CAW. Then, DTC-B 13 reads out CAW from the main storage MS. The read out CAW is then transferred to MC 11. The contents of CAW designates a key KEY used when access is made to the main storage MS for executing an input/output or I/O instruction and the address (CCW address) of MS at which a channel command word CCW is stored. The microprogram control unit MC 11 produces a request for reading out CCW to the data transfer control DTC-B 13 by using KEY and CCW addresses. The channel command word CCW read out from MS by DTC-B 13 is transferred to MC 11 which will then give the command initiate indication signal together with the identifying number allotted to the input/output unit to be initiated to the interface controller IFC 14 corresponding to the channel number designated by the CPU. In accordance with the command initiate indication signal, the interface controller IFC 14 executes the initiation processing of the command for the designated input/output or I/O device. As a result of the execution of the initiation processing, the device status byte (DSB) available from the I/O device is fed to MC 11, whereupon the initiation processing of the command is terminated. Simultaneously with the command initiation processing executed by MC 11 and IFC 14 after the transfer of CCW to MC 11, the channel control register or CCR-B 51 of the data transfer control DTC-B 13 and CCR-A 42 of DTC-A 12 are initialized in dependence on the contents of CCW. Thereafter, in accordance with the indirect data address (IDA), if present, the actual or real data address required for executing the actual data transfer is determined by reading out the indirect data address word (IDAW). When the command is of a kind related to "WRITE" operations, the relevant data is read out previously or preparatively from the main storage MS and stored in the data buffer CBS 41 of DTC-A 12.

When the command initiation processing described above has been completed, then the routine enters the data transfer processing. Since the I/O start processing by MC 11 and IFC 14 is executed in parallel with and independently from the preparatory processing for the data transfer at DTC-B 13 and DTC-A 12, it is uncertain which of the processings will first come to an end. Thus, synchronous control is required to assure that the data transfer processing is initiated after both of the processings described above have been completed. Such synchronous control is realized according to this invention by inhibiting the reception of the data transfer request from IFC 14 until the preparatory processing for the data transfer at DTC-A 12 has been completed.

Next, description will be made of the data transfer processing operations for a command relating to a variety of "WRITE" operations by referring to FIGS. 6A and 6B. The interface control IFC 14 for which the command initiation processing has been completed will produce a data transfer request to DTC-A 12 without waiting for the data transfer request from the input/output (I/O) device, when the initiated command relates to "WRITE" operations. On the other hand, when the initiated command belongs to "READ" operations, the data transfer request to DTC-A 12 is produced only after the reception of the data transfer request from the I/O. If DTC-A 12 is in the state ready for executing the data transfer, the data transfer request from IFC 14 is admitted, whereby the data transfer is executed on a one-byte basis. In the course of execution of data transfer between DTC-A 12 and IFC 14, DTC-A 12 issues at appropriate times a request for data transfer between the MS and the data buffer register (at the time when a vacant or void area is produced in CBS 41), a request for processing data chain (upon detection of a data chain instruction), and a request for processing and indirect data address (when the data address has reached the page boundary of 2K bytes) to DTC-B 13, whereby data transfer is performed between the MS and an I/O through execution of these processings by DTC-B 13.

When a required number of the data transfers have been performed between the channel in concern and the I/O, the channel starts the termination processing of the command. Referring to FIG. 7, when the residual count of data is detected to be "0" in DTC-B 13, one byte of data is transferred in response to the data transfer request from IFC 14 which is then simultaneously informed of the fact that the one byte of data being currently transferred is the last one. Consequently, after the last data has been transferred to the I/O from IFC 14, the latter transmits the command terminating indication to the I/O in response to a further data transfer request therefrom. In accordance with the command the terminating indication, I/O terminates the data transfer and supplies to the IFC 14 the device status byte DSB representing the terminated command status. In response thereto, IFC 14 informs DTC-A 12 of the fact that the data transfer has been completed. After execution of the data transfer termination processings at DTC-A 12 and DTC-B 13, the interface control IFC 14 signals to MC 11 that the command processing has now been completed. The microprogram control MC 11 reads out information about the completed data transfer status from the channel control register CCR-B 51 of DTC and executes the command chain processing or I/O interrupt processing, as the occasion requires, with the aid of the read-out information and DSB described above.

(i) Multiplex Controls

Now, description will be made of the multiplex controls effected by the individual common control units described above for different processing requests from the plurality of channels.

(a) Multiplex Controls at MC 11

Figure 8:
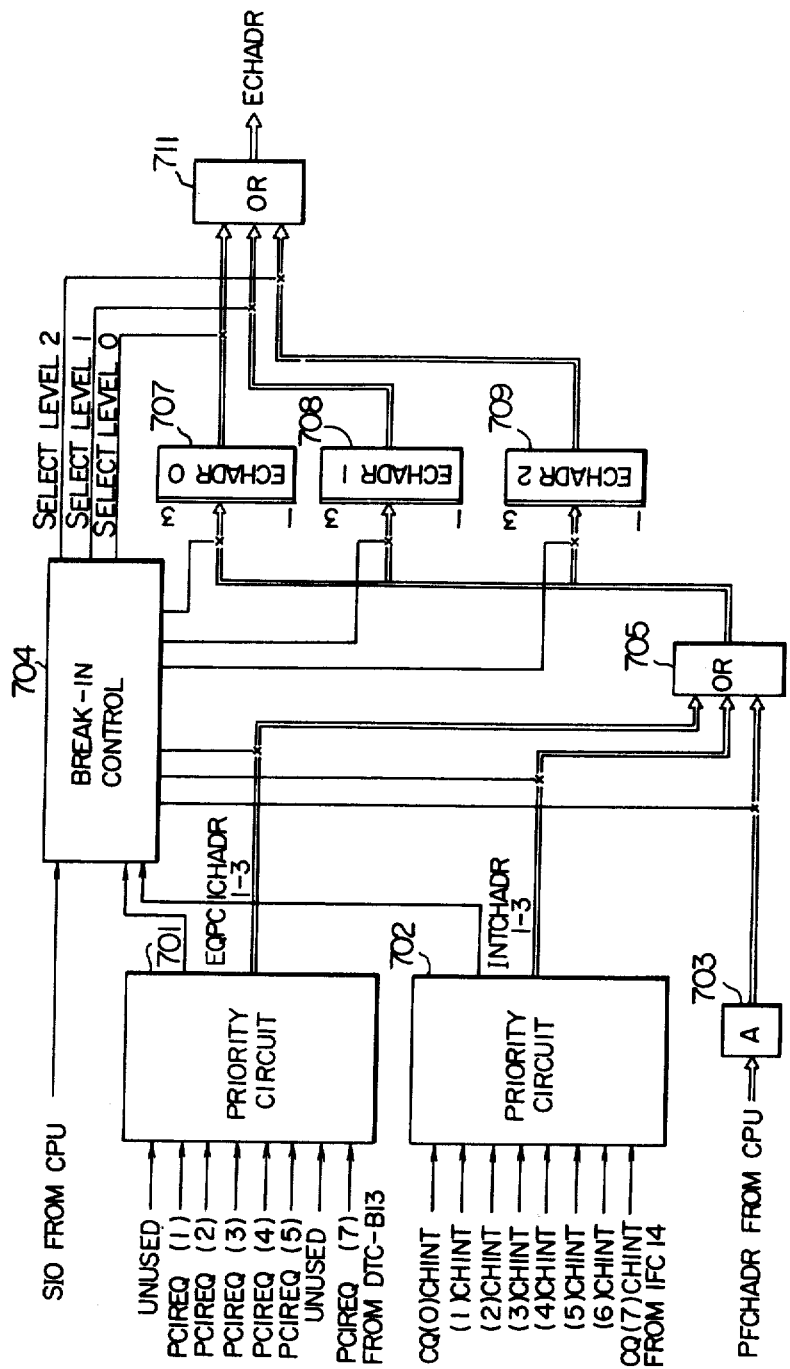
FIG. 8 is a block diagram showing a multiplex control logic in MC shown in FIG. 1.

FIG. 8 shows a logic unit for realizing the multiplex controls at MC 11.

The requests for processings to MC 11 from the other controllers includes a request for processing the start of an input/output instruction from the CPU, a request for processing the start and termination of a command from IFC 14, and a request for processing an interrupt to the programmed control as produced from DTC-B 13 in the course of executing the data transfer control. For executing these requests, MC 11 allots microprograms with three priority levels "0", "1" and "2". The smaller the number attached to the level the higher is the priority assigned thereto. By providing three levels of priorities, a processing which is currently being executed will be interrupted when a request for the processing allotted with a higher priority is produced, whereby the processing having the higher priority is executed with preference over the interrupted processing. Such interrupting operation may be referred to as "break-in". Referring to FIG. 8, reference numeral 701 denotes a priority circuit adapted to latch the programmed control interruption request signals PCIREQ(i) from DTC-B 13 (where (i) represents the numbers identifying the channels) and output the encoded number of the channel allotted with the highest priority among the requests. Numeral 702 denotes a second priority circuit adapted to latch the processing request signals CQ(i)-CHINT from IFC 14 and output the encoded number of the channel imparted with the highest priority among the requests, and 703 denotes a gate circuit which receives the signal PFCHADR representing the number identifying the started channel together with the I/O start command or instruction SIO from the CPU. The signals PCIREQ(i) from the channels labelled the numbers "0" and "6" are excluded from use, since they are used in the byte multiplex channel BYMPX in which all the controls are executed through microprograms. Because this invention concerns the control of SEL and BLMPX, description of the control of BYMPX will be omitted herein. A break-in control logic circuit 704 determines the priority levels with which the processing requests outputted from the priority circuits 701 and 702 and the gate circuit 703 are to be processed. When the item now being processed by MC 11 is lower in priority than any one of the processing requests in respect of the allotted priority order, then the coded number of the channel producing the processing request having the highest priority is input to OR gate 705 and stored in one of the channel address registers 707, 708 and 709 labelled ECHADR 0 to 2 and imparted with corresponding priority select levels. Select signal input to OR gate 711 is changed over to the one for the processing with the higher priority, whereby the channel number (ECHADR) to be alternatively processed thereafter is supplied to individual logics in MC 11. Relationships between the priority order of the various processing requests to MC 11 and the priority or select levels are summarized below.

| Priority Order | processing Requests | Select Level |
| --- | --- | --- |
| 0 | CQ(1)CHINT | 0 |
| 1 | CQ(2)CHINT | 0 |
| 2 | CQ(3)CHINT | 0 |
| 3 | CQ(4)CHINT | 0 |
| 4 | CQ(5)CHINT | 0 |
| 5 | CQ(7)CHINT | 0 |
| 6 | PCIREQ(0) | 0 |
| 7 | PCIREQ(1) | 0 |
| 8 | PCIREQ(2) | 0 |
| 9 | PCIREQ(3) | 0 |
| 10 | PCIREQ(4) | 0 |
| 11 | PCIREQ(5) | 0 |
| 12 | PICREQ(7) | 0 |
| 13 | CQ(0)CHINT | 1 |
| 14 | CQ(6)CHINT | 1 |
| 15 | Selection of Initiation from CPU and Interruption to CPU | 2 |

(b) Multiplex Control at DTC-A 12

Figure 9:
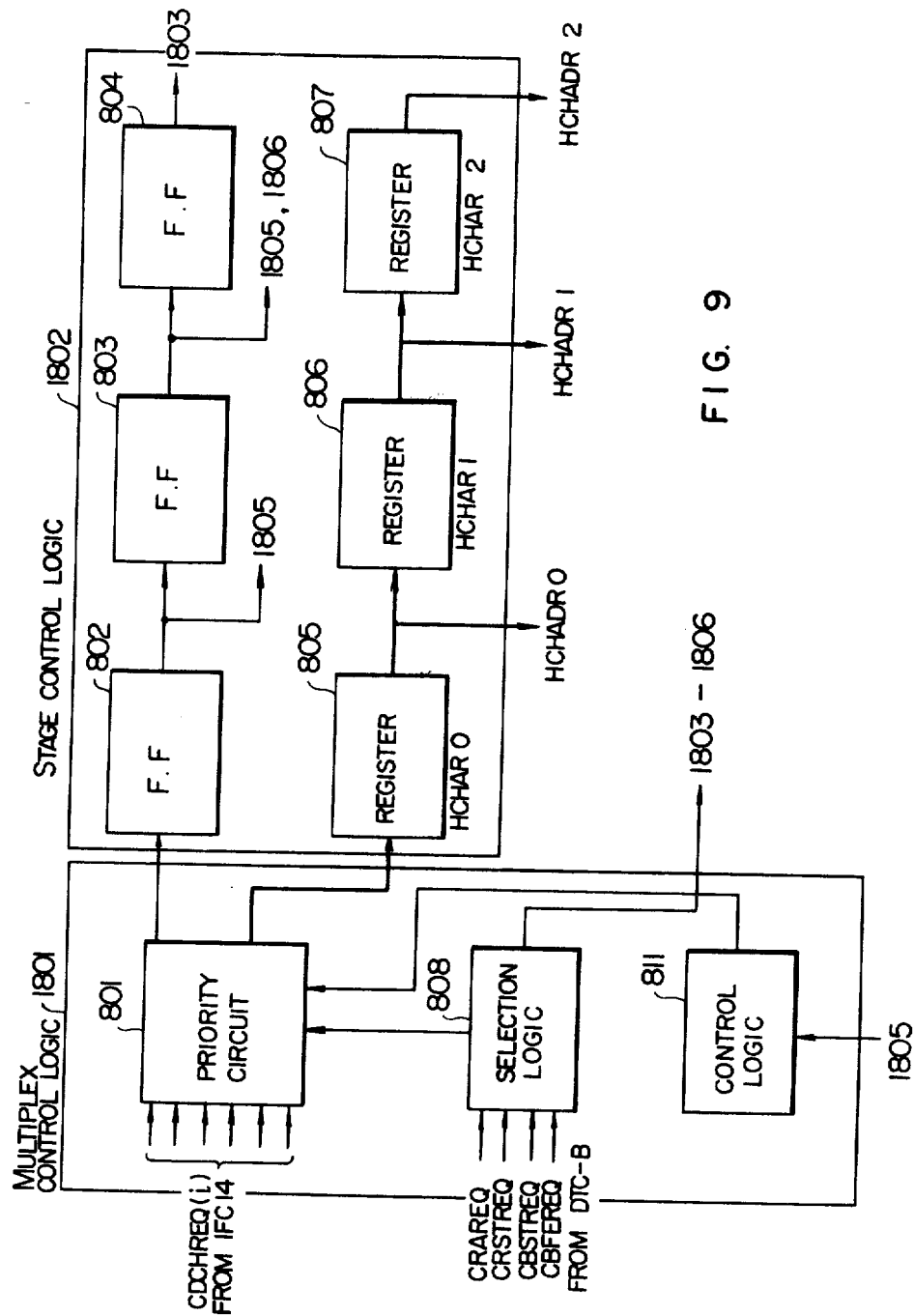
FIG. 9 shows in a block diagram a multiplex control logic and a stage control logic in DTC-A shown in FIG. 1.

FIG. 9 shows the logic circuit diagram for realizing the multiplex controls at DTC-A 12. In the Figure, reference numeral 1801 denotes a multiplex control logic unit for DTC-A, and 1802 denotes a stage control logic which will be described hereinafter in conjunction with FIG. 19. Processing requests to DTC-A 12 from other controls include the data transfer requests from IFC 14, and read/write requests to DTC-B 13 from CCR-A 42 and CBS 41, respectively. Reference numeral 801 denotes a priority circuit which is adapted to latch the processing request signals CDCHREQ(i) from IFC 14 and output the encoded number of the channel allotted with the highest priority.

The access requests from DTC-B 13 to CCR-A 42 and CBS 41 are processed with preference over the requests CDCHREQ(i) from IFC 14. This can be accomplished by a selection logic 808 which inhibits the reception of all the requests CDCHREQ(i) from IFC 14 by the priority circuit 801 for a time duration required for executing the request from DTC-B 13.

Reference numeral 811 denotes a control logic which has a function to inhibit the reception of CDCHREQ(i) and is set by DTCL-A 43 in the state unready for data transfer and is reset by DTC-B 13 in the state ready for the data transfer.

(c) Multiplex Control at DTC-B 13

Figure 10:
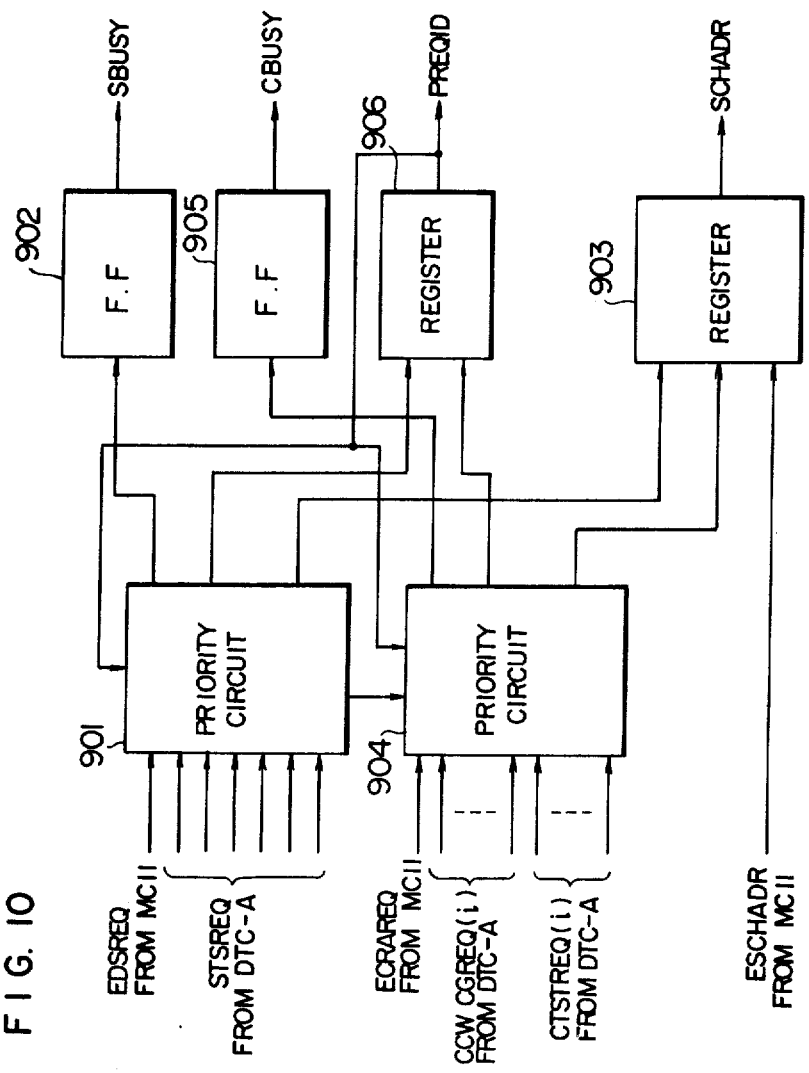
FIG. 10 shows in a block diagram a multiplex control logic in DTC-B shown in FIG. 1.

FIG. 10 shows a logic circuit diagram for realizing the multiplex control at DTC-B 13. In this Figure, reference numeral 901 denotes a priority circuit which is adapted to latch the signals EDSREQ and STSREQ from MC 11 and DTC-A 12, respectively, and output in an encoded form the number of the channel assigned with the highest priority. When any one of the requests is accepted by the priority circuit 901, a control flip-flop (SBUSY) 902 is set and at the same time the received channel number is loaded into a register (SCHADR) 903. When the request EDSREQ from MC 11 is received, it is necessary to load into the register 903 the number of the channel which requests actually the processing from MC 11. At that time, ESCHADR is set at the register 903. Simultaneously with the setting of the control flip-flop 902 and the register 903 described above, the content or type of the request accepted by the priority circuit 901 is set at a control register PRE-QID 906 which serves to designate the type of the processing to be executed by DTC-B 13 and inhibit the reception of any further requests during the execution of the single processing by DTC-B 13.

Next, description will be made of the processing of the requests such as CCW/CGREQ and CTSTREQ from DTC-A 12 and ECRAREQ from MC 11 which require no access to MS but can be processed merely by mking access to CCR-B 13. In FIG. 10, reference numeral 904 denotes a priority circuit which is adapted to latch CCW/CGREQ(i) and CTSTREQ(i) from DTC-A 12 and ECRAREQ from MC 11 to thereby output the encoded number of the channel allotted with the highest priority. The processing request accepted by the priority circuit 904 has a priority lower than that of the processing request requiring the access to MS and thus can be accepted by 904 only when no PREQID is set at the register 906 and no processing request is present to the priority circuit 901. Upon the reception of the processing request by the priority circuit 904, the control flip-flop (CBUSY) 905 is set, while the type of the accepted request is set at the register 906 and the number of the channel having the accepted request is set at the register 903. The channel number set at the register 903 corresponds to the encoded output from the priority circuit 904 for the request from DTC-A 12 and corresponds to ESCHADR for the request from MC 11.

(ii) Division of Channel Control Information and Determination of Control Register Formats Since the functions which have been heretofore executed by MC and DTC have to be executed by the three controllers, i.e. MC 11, DTC-A 12 and DTC-B 13 shown in FIG. 1 according to the teaching of this invention, it is necessary to divide the control information which has heretofore been stored in the channel control register and the sub-channel register into three parts or fields to be stored in respective registers of the individual controllers and additionally to increment the control information so as to accommodate increased stand-by or waiting duration for the processing. Further, formats of the individual control registers have significant importance as media for exchange of information among the controllers described hereinbefore. In the following, formats of the individual control registers will be described.

(a) Format of SBCR (refer to FIG. 11)

SBCR 33 is provided for each address I/O devices and constituted by a register of a 12-byte capacity to store status information required for MC 11 to determine the condition code for the input/output instruction, control information for executing the command chain and the control information for executing the interrupt or break-in processing.

Referring to FIG. 11, the format is composed of following areas.

0-0: unused 0-1: USQC (Unit Sequence Code)
The status information such as command being executed, interruption being suspended or the like is contained.

0-2: NIQR (Next Interrupt Queue Register)
When interrupt is being suspended, the I/O address which is next to be processed in an interrupt queue is indicated.

0-3: BIQR (Backward Interrupt Queue Register)

When interrupt is being suspended I/O address which was to be processed immediately before in the interrupt queue is indicated.

1-0: KEY

Key of CAW is contained to be used for reading out CCW.

1-0: DDC (Deferred Condition Code)

Upon executing the instruction "Start I/O Fast Release", DCC is temporarily stored, if it is necessary to signal DCC.

1-1~3: NEXT CCW ADDRESS

Address of CCW in the channel status word (CSW) at the time of input/output interruption as well as the address of CCW used for executing the command chain started by DSB unique to the terminal device are indicated.

2-0~3: DSB, CSB, DATA, COUNT

These areas are used for temporarily storing DSB in CSW, channel status byte (CSB) and residual data count.

(b) Format of CCR-B (Refer to FIG. 12)

CCR-B 51 is provided correspondingly for each channel and constituted by a control register of a 24-byte capacity to store control information to be used for data transfer control between DTC-B 13 and MS and the channel, data chain control, IDA control and data transfer termination control. This format is composed of following areas:

0-0: KEY

KEY which is used for making access to MS is stored.

0-1~3: NEXT CCW ADDRESS

Address of CCW used for execution of data chain is indicated. Upon requests for starting a command and for reading out CCW for the command chain from MC 11, the address of CCW transferred from MC 11 plus 8 is stored. Subsequently, the stored content is updated for each read-out of CCW upon execution of the data chain by adding 8. When an in-channel jump command (TIC) is produced during execution of data chain, the stored content is replaced by the address given by TIC.

1-0: FLAG

Bits designating data chain (CD), command chain (CC), incorrect word length suppression (SLI), skip (SKIP) and IDA as indicated by flag field in CCW are stored.

1-1: CSB

Error information produced upon execution of data transfer is contained. Such error information includes channel control check error (CCC), channel data check error (CDC), program check error (PC), and protection check error (PRC).

1-2~3: DATA COUNT

Residual count of data upon execution of data transfer is indicated.

2-1~3: NEXT IDAW/NEXT CCW ADDRESS+8

Preparatively or previously fetched (i.e., pre-fetched) indirect data address word (IDAW) is stored. When TIC is produced upon the execution of data chain, address of CCW indicated by TIC plus 8 is stored.

3-0: PF FLAG

Flag area of CCW pre-fetched upon the execution of data chain is stored.

3-1: PF CSB

Error information produced during pre-fetching processing of CCW, IDAW and data upon the execution of data chain is stored. The types of error are the same as those described above in conjunction with CSB.

3-2: PF DATA COUNT

Data count area of pre-fetched CCW upon execution of data chain is stored.

4-1~3: DATA ADDRESS

Data address in MS at the time of executing data transfer is indicated.

5-1~3: NEXT IDAW ADDRESS

Address in MS at which IDAW next to be executed is stored is indicated.

(c) Format of CCR-A (refer to FIG. 13)

CCR-A 42 is provided correspondingly for each channel and constituted by a control register of a 8-byte capacity to store therein control information of CBS 41 and information for controlling various processing requests to DTC-B 13 from DTC-A 12. This format is composed of the following areas:

0-0-0: CD

Indication of data chain.

0-0-1: IDA

Indication of IDA.

0-0-2: SKIP

Indication of skip in read data.

0-0-3: NIDAWW (Next IDAW Wait)

0-0-4: CADRW (Control Address Wait)

0-0-5: DADRW (Data Address Wait)

0-0-6: FNIDAW (Fetch Next IDAW)

Four bits of 0-0-3 to 0-0-6 serve to control the sequence of executing requests, when the requests for data transfer with MS, for reading out CCW of data chain and for reading out of IDAW, respectively, are produced in plurality. Detailed description of the individual bits will be made hereinafter in conjunction with the data transfer processing.

0-1-0~1: SRF (Storage Request Failure)

These are bits used for storing abnormality appearing in the data transfer processing with MS. Detailed description of the individual bits will be made hereinafter in conjunction with the processing of failures.

0-1-2: DR 0 (Data Request 0)

Issue of data storage request to MS from CBS 41 is informed to DTC-B 13 from DTC-A 12.

0-1-3: DR 1 (Data Request 1)

Issue of data read request to CBS 41 from MS is informed to DTC-B 13 from DTC-A 12.

0-1-4~6: CF (Control Fetch)

Types of read requests for CCW and IDAW from DTC-A 12 to DTC-B 13 as well as results of read are stored. Detailed description of these bits will be made hereinafter in conjunction with the data transfer processing.

0-2: SP (Start Pointer)

First address of CBS 41 upon data transfer with MS is indicated. The first address is updated for each execution of data transfer between channel and MS.

0-3: LP (last Pointer)

The last address of CBS 41 at which the data transfer with MS can be still executed is indicated.

1-0-5: LDT (last Data Transfer)

In common to "READ" and "WRITE" operations, indication is made on the fact that data transfer with IFC 14 has not yet been executed. These bits are set when CCW is fetched at the initial start or command chain and reset when CD(i) CHREQ is received from IFC 14, and set again upon the reception of CDLDX from IFC 14 or when the value of residual byte count becomes equal to "0" in the case of command relating to "READ" operations. On the other hand, in the case of command relating to "WRITE" operations, these bits are set again also upon information of LDT from IFC 14.

1-0-6: COM 0 (COmM and 0)
1-0-7: COM 1 (ComM and 1)

These bits are used for identifying command being currently executed and prepared by decoding the three least significant bits of the command pattern of CCW fetched at the initial start or command chain. Combinations are as follows:

| COM 0 | COM 1 | Commands |
|-------|-------|----------|
| 0 | 0 | WRITE |
| 1 | 0 | READ |
| 1 | 1 | READ BACKWARD |

1-1: CP (Current Pointer)
  Address of CBS 41 at which the next data transfer is to be executed between DTC-A 12 and IFC 14 is indicated.
1-2~3: DATA COUNT
  Residual count of data in the course of transfer execution is indicated.

(iii) Interfaces Between Controls

Figure 15:
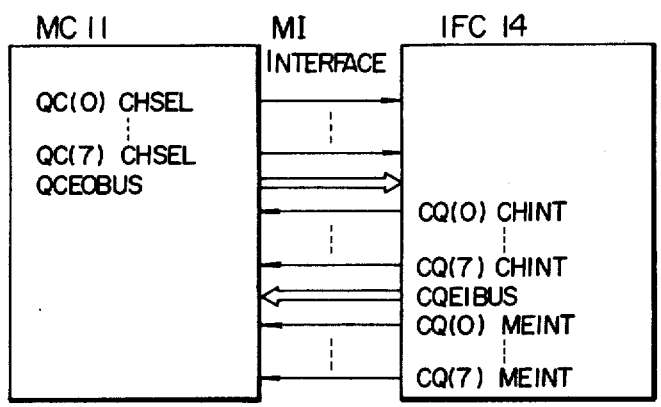
FIG. 15 shows MI interface between MC and IFC.
Figure 16:
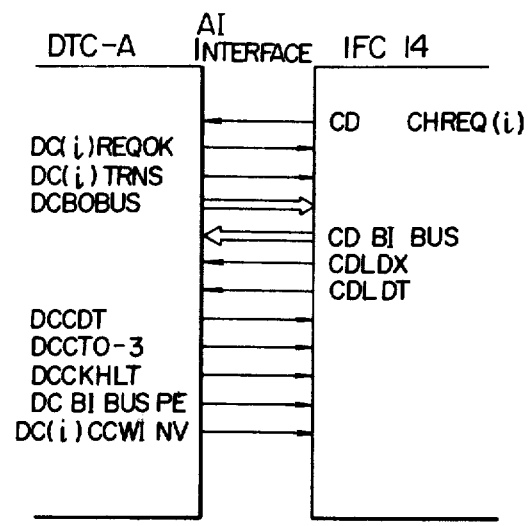
FIG. 16 shows AI interface between DTC-A and IFC.
Figure 17:
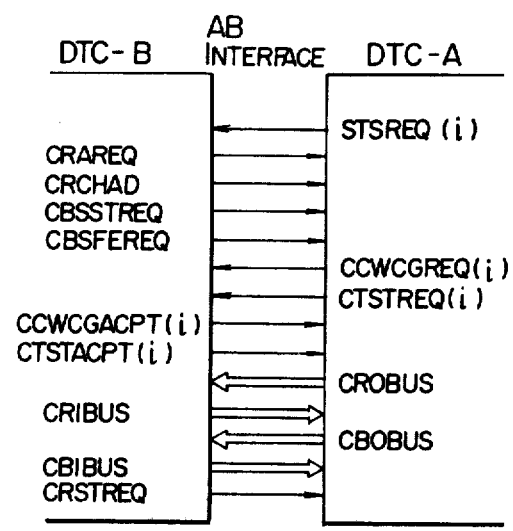
FIG. 17 shows AB interface between DTC-B and DTC-A.

In the channel control system including a plurality of common controls for controlling a plurality of channels, it is important how to design the interfaces between the individual control units in such standardized manner that the plurality of channels having different statuses can be handled equivalently and that the predetermined functions assigned to the individual control units can be properly executed. In the following, specifications of interfaces between the control units according to this invention will be described by referring to FIG. 14 to 17, in which FIG. 14 illustrates interfaces between MC11 and DTC-B 13, FIG. 15 illustrates interfaces between MC 11 and IFC 14, FIG. 16 illustrates interfaces between DTC-A 12 and IFC 14, and FIG. 17 illustrates interfaces between DTC-A 12 and DTC-B 13.

(a) Interfaces between MC 11 and DTC-B 13 (referred to as MB interface)

Figure 14:
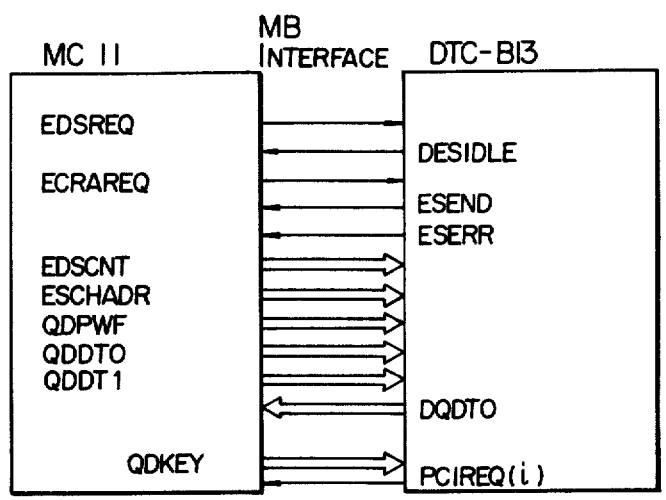
FIG. 14 shows MB interface between MC and DTC-B.

In FIG. 14 illustrating MB interface, labels attached to various signal lines represent the following matters:
EDSREQ: Processing request signal to MS as set by the microprogram.
DESIDLE: Reception of EDSREQ at DTC-B 13.
ECRAREQ: Request signal for reading out CCR-B 51 supplied to DTC-B 13 from MC 11.
ESEND: Completion of requested operations of DTC-B 13.
ESERR: Detection of some error at DTC-B 13 for the request to MS from MC 11.
EDSCNT 0-2: Types of requests to MS are as follows:

| 012 | Contents |
|-----|----------|
| 000 | |
| 001 | to be used in BYMPX control |
| 010 | |
| 011 | |
| 100 | store CSW |
| 101 | fetch CAW |
| 110 | fetch CCW |
| 111 | for BYMPX control |

ESCHADR: Address of the channel having request to MS.
QDPWF: Fragmental write flag to MS upon storage of information being requested.
QDDT 0: Data bus for transferring information to be stored in MS.
QDDT 1: Address of MS to which access is to be made.
DQDT 0: Data bus for transferring information read out from MS and CCR-B 51.
QDKEY: Transfer of KEY to be used when access is made to MS.
PCIREQ: PCI processing request issued to MS 11 when PCI (programmed control interrupt instruction) is detected during the execution of data chain by DTC-B 13. This request is provided for each channel.

(b) Interfaces between MC 11 and IFC 14 (referred to as MI interface)

In FIG. 15 illustrating MI interface, labels attached to various signal lines represent the following items:
QC(i)CHSEL: Exchange of information between the designated IFC 14 and MC 11 through the coupling interface established therebetween. The label may be replaced by CHSEL for the transfer of information to the single IFC 14 at one time.
QCEOBUS: Data bus for transferring information to individual IFC's 14 from MC 11. Instruction on operation of IFC 14 is contained in the first byte.
CQ(i)CHINT: Presence of information to be transferred to MC 11 from IFC 14. Since CHINT's may be supplied to MC 11 simultaneously from a plurality of IFC's 14, the processing of CHINT is performed in accordance with the predetermined priority order at the side of MC 11.
CQEIBUS: Data bus for transmitting information to MC 11 from IFC 14. Singal QC(i)CHSEL designates those IFC's 14 the information of which is only allowed to be transmitted through this data bus.
CQ(i)MEINT: Detection of interface control check ICC or channel control check CCC by IFC 14.

(c) Interfaces between DTC-A 12 and IFC 14 (referred to as AI interface)

In FIG. 16 illustrating AI interface, labels attached to various signal lines represent the following items:
CD(i)CHREQ: Processing request signal issued from IFC 14 to DTC-A 12.
DC(i)REQOK: Reception signal for CD(i)CHREQ.
DC(i)TRNS: Signal indicating that data and control information are being transferred to IFC 14 from DTC-A 12.
DCBOBUS: Data bus for transferring data to IFC 14 from DTC-A 12.
CDBIBIS: Data bus for transferring data to DTC-A 12 from IFC 14.
CDLDX: Signal indicating the reception of command termination signal from I/O, as issued to DTC-A 12 from IFC 14.
CDLDT: Signal indicating that the last data of CCW being currently executed in the data chain for the execution of command of "WRITE" operation series has been transferred to I/O.

DCCDT: Signal supplied to IFC 14 from DTC-A 12 and indicating the issue of data chain instruction for the command being currently executed.

DCCT 0~3: Signal supplied to IFC 14 from DTC-A 12 and informing of the residual count of data.

DCCKHLT: Signal supplied to IFC 14 from DTC-A 12 and commanding termination of data transfer because of detection of failure.

DCBIBUSPE: Detection of parity error in the data on CDBIBUS.

DC(i)CCWINV: Signal supplied to IFC 14 and indicating that the data transfer processings at DTC-A 12 and DTC-B 13 have been completed.

(d) Interface between DTC-A 12 and DTC-B 13 (referred to as AB interface)

In FIG. 17 illustrating AB interface, labels attached to various signal lines represent the following items:

STSREQ(i): Processing request signal to DTC-B 13 from DTC-A 12, provided for each channel. The type of processing as requested is designated by contents of CCR-A 42.

CRAREQ: Signal for requesting access to CCR-A 42 supplied to DTC-A 12 from DTC-B 13 for determining the type of requested processing in response to acceptance of the processing request from DTC-A 12 by DTC-B 13.

CRCHAD: Number identifying the channel to which access request is issued from DTC-B 13.

CBSSTREQ: Signal for requesting storage of data read out from MS in CBS 41, as supplied to DTC-A 12 from DTC-B 13.

CBSFEREQ: Signal for requesting read-out of data from CBS 41 to be stored in MS, as supplied to DTC-A 12 from DTC-B 13.

CCWCGREG(i): Signal supplied from DTC-A 12 to DTC-B 13 for requesting the processing to replace the pre-fetched CCW by the current or actual CCW in response to the completed transfer of the last data of the current CCW at IFC 14 upon execution of data chain. This signal is provided for each channel.

CTSTREQ(i): Signal issued from DTC-A 12 to DTC-B 13 for requesting the processing to transfer the final residual count of data from CCR-A 42 to CCR-B 51 in response to the perfect completion of data transfer. This signal is provided for each channel.

CCWCGACPT(i): Signal supplied form DTC-B 13 to DTC-A 12 for informing the acceptance of CCWCGREQ. This signal is also provided for each channel.

CTSTACPT(i): Signal issued from DTC-B 13 to DTC-A 12 for informing the reception of CTSTREQ, being provided for each channel.

CROBUS: Data bus for transferring the information read out from CCR-A 42 to DTC-B 13.

CRIBUS: Data bus for transferring information to be stored in CCR-A 42 to DTC-A 12 from DTC-B 13.

CBOBUS: Data bus for transferring the data read out from CBS 41 to DTC-B 13.

CBIBUS: Data bus for transferring the data to be stored in CBS 41 to DTC-A 12 from DTC-B 13.

CRSTREQ: Signal issued from DTC-B 13 to DTC-A 12 for requesting the write-in in CCR-A 42.

Figure 18:
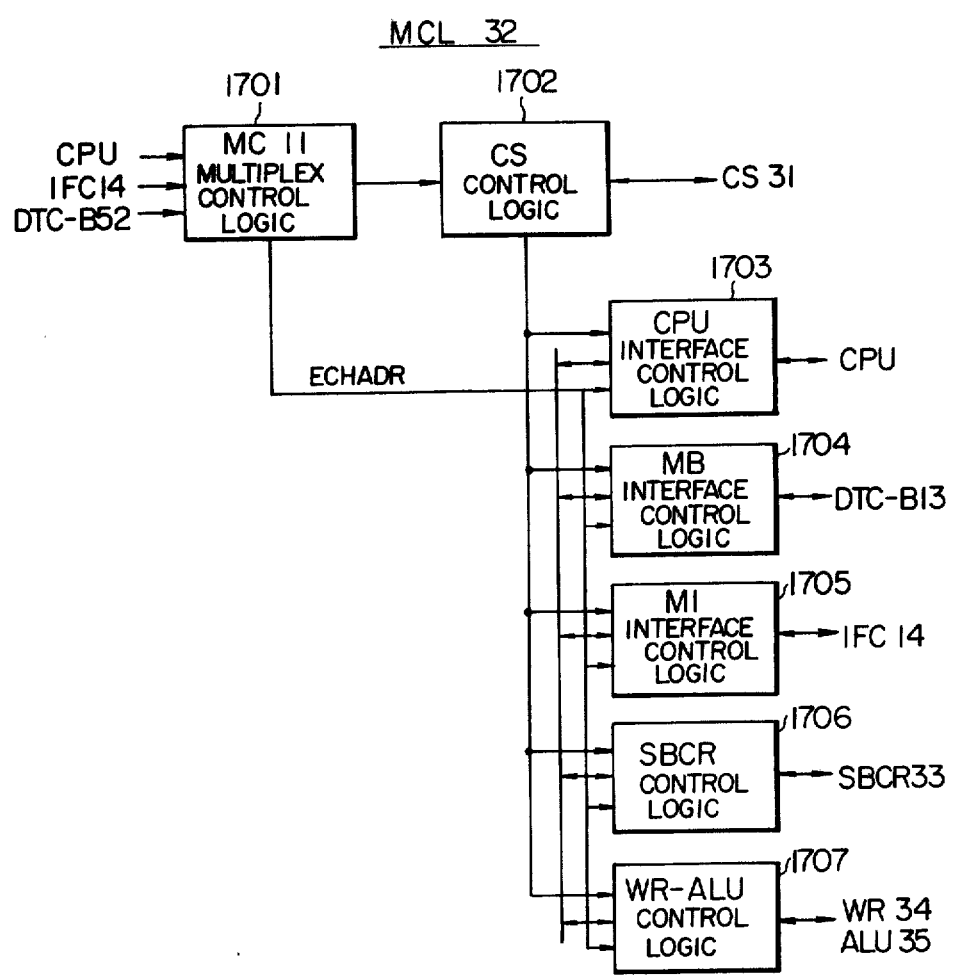
FIG. 18 shows in a block diagram an arrangement of a microprogram control logic (MCL) shown in FIG. 2.
Figure 19:
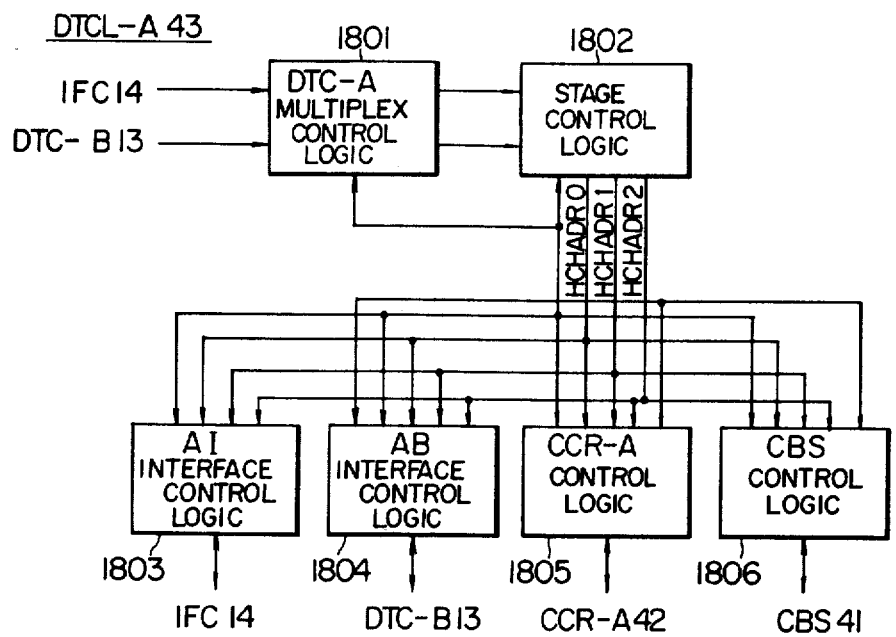
FIG. 19 shows in a block diagram an arrangement of a control logic (DTCL-A) for controlling the operation of DTC-A shown in FIG. 3.
Figure 20:
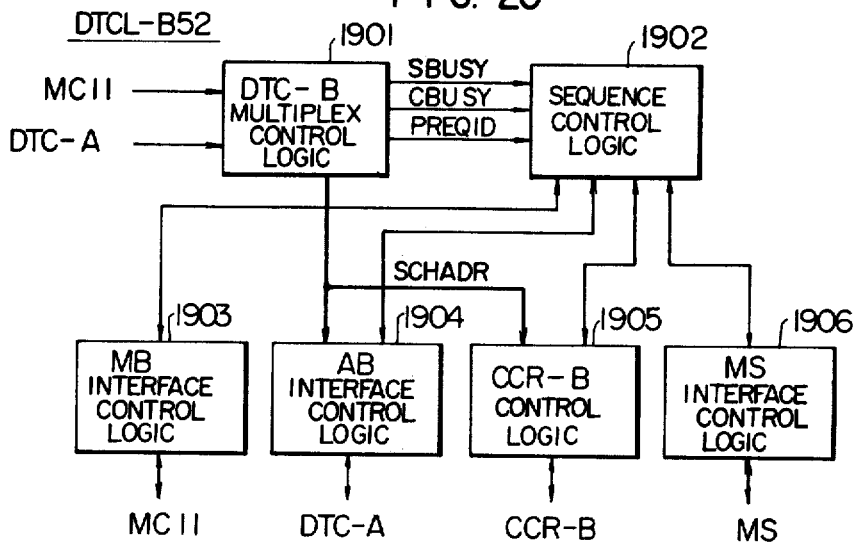
FIG. 20 is a block diagram to illustrate a control logic (DTCL-B) for controlling the operation of DTC-B shown in FIG. 4.

Next, operations of various control units and interface operations between the control units for executing the command initiation processing, data transfer processing and the command termination processing as outlined hereinbefore with reference to FIG. 7 will now be described in detail by following the routines illustrated in the flow chart of FIG. 7 with reference being made also to FIGS. 18, 19 and 20 showing block diagrams of MCL 32, DTCL-A 43 and DTCL-B 52, respectively.

Referring to FIG. 18, the flow of operations at MCL 32 will be briefly reviewed. One of the processing requests issued to MC 11 from the other controllers is selectively accepted by a multiplex control logic circuit 1701, whereby the encoded number of the channel corresponding to the accepted request is supplied as ECHADR (see also FIG. 8) to CPU interface control logic 1703, MB interface control logic 1704, MI interface control logic 1705, SBCR control logic 1706 and WR-ALU control logic 1707, while the contents of the accepted request are applied to CS control logic 1702. In dependence on the contents of the accepted request, the CS control 1702 determines the addresses of CS 31 at which a microprogram required for executing the requested processing is stored, and reads out the microinstructions sequentially from the CS 31. In accordance with the microinstructions as read out, the various control units described above are correspondingly controlled to execute the requested processing.

Next, referring to FIG. 19 which illustrates the outline of operations of DTCL-A 43, one of the processing requests issued to DTC-A 12 from the other controls is selectively accepted by a multiplex control logic 1801. The contents of the accepted request and the number identifying the channel associated therewith are transferred to a stage control logic 1802, which serves to divide the requested processing into three continuous stages as described hereinbefore in conjunction with FIG. 9. To this end, the stage control logic 1802 includes the control flip-flops 802, 803 and 804 for indicating whether the associated processing stages are actually executing the divided and assigned processings, and registers HCHADR 0-805, HCHADR1-806 and HCHADR2-807 which are adapted to give indications of the channel number for which the processing is being actually or really executed at the associated stages. Reference is to be made also to FIG. 9. With the arrangement described above, it is possible to execute the different processing requests originated from three channels in an overlapped manner (pipe line processing). The control signals as well as the channel number(s) available from the individual processing stages of the stage control unit 1802 are transferred to the AI interface control logic 1803, AB interface control logic 1804, CCR-A control logic 1805 and the CBS control logic 1806, whereby the requested processing is executed.

Referring to FIG. 20 which shows a general arrangement of DTCL-B 52, one of the processing requests to DTC-B 13 from the other controllers is selectively accepted by a multiplex control logic 1901, whereby the contents of the accepted request is transferred to a sequence control logic 1902, while the channel number associated with the accepted request is supplied as SCHADR to AB interface control logic 1904 and CCR-B control logic 1905. In dependence on the accepted request, the sequence control logic 1902 generates a required sequence for controlling MB interface control logic 1903, AB interface control logic 1904, CCR-B control logic 1905 and MS interface control logic 1906, thereby to allow the requested processing to be executed.

(iv) Command Initiation (1) Reception of START I/O Instruction

When a START I/O instruction is issued in the CPU MC 11 is supplied at inputs thereof with a start indication signal SIO along with the start channel number PFCHADR and the start I/O number PFIOADR (not shown). The signal SIO is inputted to the break-in control logic 704 of the MC 11 multiplex control logic 1701 in MCL 32. The break-in control logic 704 then determines whether MC 11 is capable of executing the initiation processing at that time. As described hereinbefore in the section 1 "Multiplex Control", since the initiation processing request issued from the CPU is executed with the lowest priority at the level "2", this request is accepted by MC 11 only when other processing allotted with higher priorities is not being executed. Otherwise, the acceptance of SIO is delayed until the other processing has been terminated at MC 11. When the signal SIO is received by the break-in control logic 704, the control signal which enables the output of AND circuit 703 having an input applied with the start channel number to be input to the OR circuit 705 is turned on, and the control signal which enables the output of the OR circuit 705 to be set at the register 709 for storing the channel number executed with the priority level "2" is also turned on, whereby the start channel number is loaded in the register 709. Subsequently, when the execution indicating signal of the priority level 2 (Select Level 2) is turned on thereby to allow the output of the register 709 to be inputted to the OR circuit 711, the start channel number is supplied to MC 11 as the channel number ECHADR the processing of which is now executed. Thereafter, the address of CS 31 at which the microprogram for processing the command start is stored is prepared by the CS control logic 1702, whereby the processing of the command start is executed through the execution of the microprogram.

(2) Determination of Status of Start I/O

The first processing to be executed after the terminated initiation processing of the command is to determine whether the start I/O is in the state ready to accept the started command. Under the control of CS control logic 1702, ECHADR output from the MC multiplex control logic 1701 and PFIOADR output from the CPU interface control logic 1703 are supplied to the SBCR control logic 1706, thereby to read out SBCR corresponding to the start I/O and load into the work register WR2 (34) allotted with the priority select level 2. Subsequently, in dependence on the pattern of USQC in SBCR as determined by ALU 35, the status of the start I/O is decided. If the start I/O is in the idle state, the processing of the command is initiated.

(3) Fetch Processing of CAW (a) CAW fetch request to DTC-B 13 from MC 11

In order to read out CAW stored in MS at a fixed address (72-th address), the MB interface control logic 1704 controls the MB interface to issue a request to DTC-B 13 for fetching CAW. In the MB interface (refer to FIG. 14), then the processing request signal EDSREQ is set, and EDSCNT's 0, 1 and 2 for indicating the type of the processing request is set of "1, 0, 1". The start channel number ECHADR is set by ESCHADR, while QDKEY is set to all "0's" in the sense of key to spare the check for store protection, and 72th address is set at QDDT1 indicating MS address. Thus, the CAW fetch request is produced.

(b) Reception of CAW Fetch Request at DTC-B 13

EDSREQ is inputted to the priority circuit 901 of the multiplex control logic 1901 in DTCL-B 52. Among the processing requests accepted by DTC-B 13, the processing request from MC 11 to MS is allotted with the highest priority. Accordingly, this request is immediately accepted, when DTC-B 13 is in the idle state, i.e. when PREQID 906 has no load. Otherwise, EDSREQ has to wait until PREQID 906 has been idle, whereupon the request is addmitted to the priority circuit 901 with preference over the other requests. Then, the SBUSY flip-flop 902 is set, EDSREQ is set at PREQID 906, and ESCHADR is gated to SCHADR 903. When the EDSREQ, one of the types of request is set at PREQID 906, then the MB interface control logic 1903 issues the response signal DESIDLE to MC 11 and receives EDSCNT, QDKEY and QDDT1 under the command of the sequence control logic 1902. When the sequence control logic 1902 recognizes the CAW fetch request on the basis of the contents of EDSCNT, the control logic 1902 orders the MS interface control logic 1902 to issue the CAW fetch request to MS by using QDKEY and QDDT1 and KEY and CAW addresses of MS. When CAW is transferred from MS, the MB interface control logic 1903 responds to MS by supplying the termination or end signal ESEND thereto and sets CAW on DQDTo for the transfer under the command of the sequence control logic 1902.

(4) Fetch Processing of CCW

In response to ESEND from DTC-B 13, the CS control logic 1702 transfers CAW from DQDTo to WR2-34 and commands the MB interface control logic 1704 to set EDSREQ and set CCW fetch request of "110" to EDSCNT, while setting KEY and CCW addresses in CAW to QDKEY and QDDT$_1$, respectively, whereby CCW fetch request is issued to DTC-B 13. Upon reception of EDSREQ of CCW fetch request, DTC-B 13 reads out CCW from MS in the similar operation as the case of CAW fetch request described above and transfers the read CCW to MC 11, while executing the preparatory processing for the data transfer.

(5) Start Processing of I/O

Upon reception of the response ESEND from DTC-B 13 for the CCW fetch request, CCW on DQDT$_0$ is set to WR2-34 under the control of the CS control logic 1702. At the same time, through control of M1 interface control logic 1705, QC(i)CHSEL is set for IFC 14 to be started, while the command start indication, the start I/O number and the command are transferred to QCEOBUS. At this time, MC 11 sets USQC of SBCR 33 to the stand-by state for waiting termination of the start processing and completes the processing of the priority level 2.

IFC 14 commanded to execute the start processing of I/O controls the I/O interface to initiate I/O of the identification number designated by MC 11, transfer the command, receive DSB and terminate the I/O start processing. Subsequently, IFC 14 sets CQ(i)CHINT for informing MC 11 of the completion of I/O start processing.

(6) Reception of CQ(i)CHINT at MC 11

CQ(i)CHINT are accepted by MC 11 in accordance with the order described hereinbefore in the section 1 "Multiplex Control". Since CQ(i)CHINT from BLMPX and SEL are processed with the priority select level 0, the channel number is set at ECHADR$_0$ register 707.

When CQ(i)CHINT are accepted to the multiplex control logic 1701 of MC 11, the CS control logic 1702 returns QC(i)CHSEL from MI interface control logic 1705 to IFC 14. In response to QC(i)CHSEL the IFC 14 informs MC 11 of the completion of I/O start processing by using CQEIBUS and transfers the start I/O number and DSB transferred from I/O to MC 11 through CQEIBUS. The CS control logic 1702 uses ECHBUS and the start I/O number sent from IFC 14 to read out SBCR of the corresponding I/O from SBCR 33 to WRO-34 again, confirm waiting of the termination of the start processing from USQC and check the DSB. If the DSB is normal, at that timing the CPU interface control logic 1703 informs the CPU of the condition code 0, i.e., the completion of the start processing as a result of the START I/O command.

(7) Preparatory Processing of Data Transfer

DTC-B 13 transfers CCW to MC 11. At the same time, under the control of the sequence control logic 1902, the CCR-B control logic 1905 executes the initialization of the area to be occupied by SCHADR of CCR-B 51. The initialization processing for CCR-B 51 is effected by setting the key used for fetching CCW at the area for KEY, setting the value equal to the CCW address used for fetching CCW plug 8 at the area for NEXT CCW ADDRESS, setting the flag of the fetched CCW at the area for FLAG, and by setting the data address bits of CCW at the area for NEXT IDAW ADDRESS in the case IDA=1 and at the area for DATA ADDRESS in the case IDA=0, while all the other areas are cleared to "0's". Subsequently, CRAREQ is set through the AB interface control logic 1804 thereby to initialize CCR-A 42.

(8) Reception of CRAREQ at DTC-A 12

Figure 21:
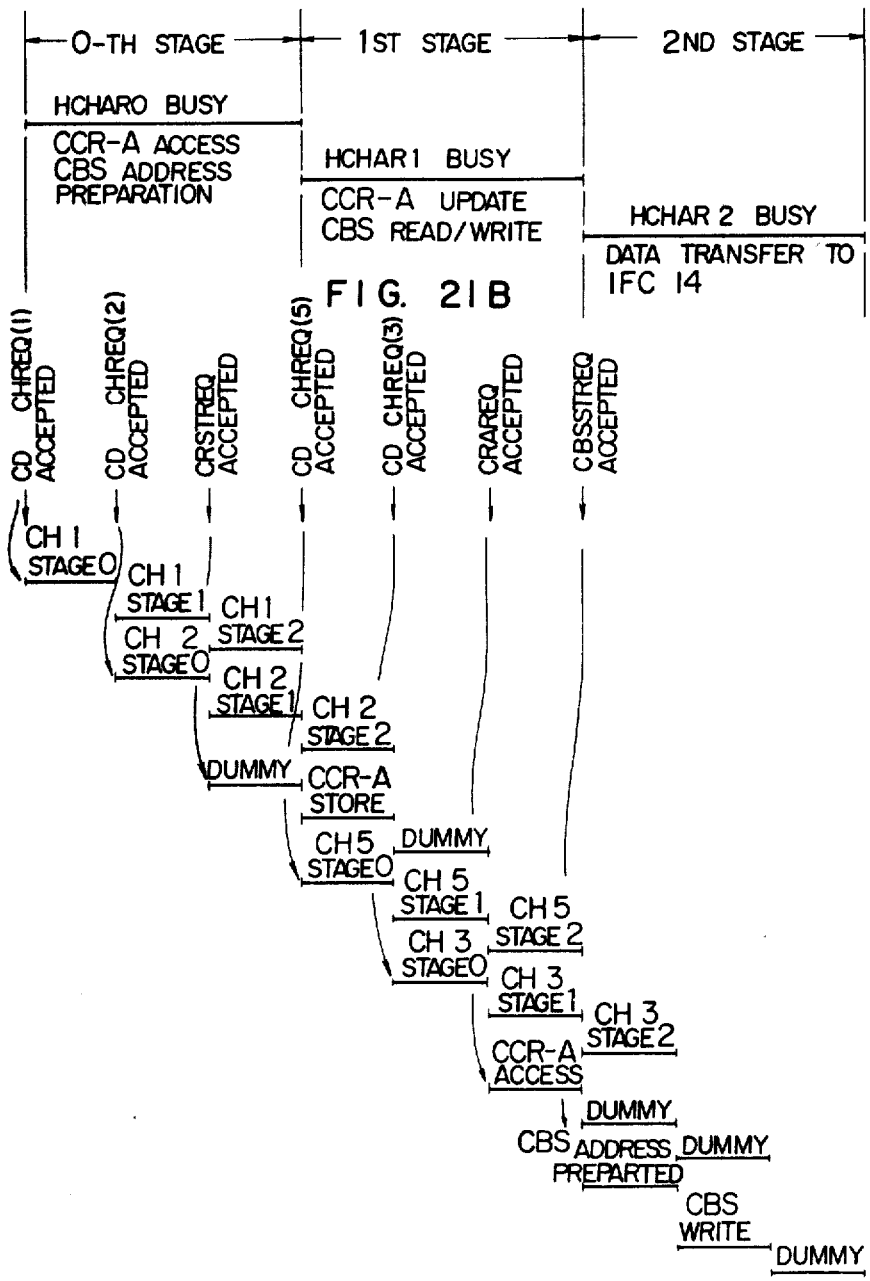
FIGS. 21A and 21B are to illustrate multiplex control at DTC-A.

In DTC-A 12, the processing request from DTC-B 13 is accepted with the highest priority by the multiplex control logic 1801 and, for the time required for processing this request, the processing requests from IFC 14 are inhibited from being accepted by the priority circuit 801. Thus, DTC-B 13 is capable of executing the requested processing after a predetermined time lapse synchronized with the processing request signal. In the case of initialization of CCR-A 42, upon reception of CRSTREQ, the multiplex control logic 1801 inhibits the reception of a processing request from IFC 14 for a single machine cycle. Consequently, DTC-B 13 is allowed to set information at CCR-A 42 after two machine cycles, because the processing requests from IFC 14 are processed in an overlapped manner in three stages at DTC-A 12. Such overlapped processing is illustrated in the time chart of FIG. 21A. Accordingly, after a time lapse of two machine cycles from the issue of CRSTREQ, DTC-B 13 sets SCHADR and the CCR-A 42 initializing information of CRCHAD and CRIBUS, respectively, while at the CCR-A control logic 1805 of DTC-B 13, the area of CCR-A 42 for the channel indicated by CRCHAD is initialized on the basis of CCR-A initializing information. The contents initialized in CCR-A 42 includes bits of CD, IDA and SKIP in the flag field of CCW, COM in the command field of CCW and DATA COUNT in the data count field of CCW, respectively. When no indication of IDA is present (i.e. IDA=0), SP and CP from the data address field of CCW are initialized and simultaneously set, and additionally $DR_1$ is also set, on "WRITE" command. When $DR_1$ is set, the AB interface control logic 1804 sets STSTREQ(i) thereby to request DTC-B 13 to fetch data from MS. If an indication of an indirect data address is present for IDA=1, $CF_{0-2}$ will be set to "011" at the initialization of CCR-A 42, indicating the presence of fetch request for the first IDAW, whereby the AB interface control logic 1804 sets STSREQ(i) to issue the request for IDAW to DTC-B 13.

STSREQ(i) from DTC-A 12 is accepted by the multiplex control logic 1901 of DTC-B 13 in the sequence described hereinbefore in the section "Multiplex Control", and the control is changed over the sequence control logic 1902. When the subject to be processed is determined to be STSREQ(i), the sequence control logic 1902 will immediately set CRAREQ and read out $DR_{0-1}$ and $CF_{0-2}$ from CCR-A 42 to acquire the contents of the request. The sequence in which CRAREQ is accepted and executed at DTC-A 12 is the same as the case of CRSTREQ. The contents of the read-out CCR-A 42 are transferred through CROBUS.

DTC-B 13 determines the contents of requested processing from the contents of $DR_{0,1}$ and $CF_{0-2}$ to execute the corresponding processing.

In the case of the fetch request for the first IDAW, KEY and NEXT IDAW ADDRESS of CCR-B 51 are read out to issue the fetch request of IDAW to MS. In response to the transfer of IDAW from MS, the sequence control logic 1902 orders CCR-B control logic 1905 to store IDAW into DATA ADDRESS area of CCR-B 51 and subsequently orders the AB interface control logic 1904 to initialize SP and CP of CCR-A 42 in accordance with the contents of IDAW. CCR-B control logic 1905 recognizes establishment of the data address after the initialization of SP and CP and sets $DR_1$ when COM specifies "WRITE" operations, whereby STSREQ(i) is set at the AB interface control logic 1904. DTC-B 13 receives STSREQ(i) and, when $DR_1$ is equal to "1", reads out KEY and DATA ADDRESS from CCR-A 42, thereby to request MS to transfer data.

When data is transferred from MS, DTC-B 13 updates DATA ADDRESS of CCR-B 51, sets CBSSTREQ for DTC-A 12 and transfers to CBS 41 the data fetched from MS through CBIBUS. The accepting operation for CBSSTREQ at DTC-A 12 is carried out in the same manner as those for CRSTREQ and CRAREQ. The time point at which the data is written in CBS from DTC-B 13 occurs after two machine cycles from the issue of CBSSTREQ, because access to CBS 41 is made at the first stage as can be seen from FIG. 21.

(9) Synchronizing Control

The preparatory processing for the data transfer at DTC-B 13 and DTC-A 12 has thus been completed and thus the request for data transfer from IFC 14 can now be accepted. The inhibit of reception of the data transfer request from IFC 14 imposed on DTC-A 12 is removed by the control logic 811 of the multiplex control 1801 (FIG. 9). The control logic 811 is adapted to inhibit usually the acceptance of the processing requests from IFC 14 associated with the channel for which no command is executed. The above inhibiting condition is removed when the data address is established, that is, the initial values of SP and CP are set on "READ" command or when data is stored into CBS 41 on "WRITE" command.

(v) Data Transfer Processing (1) Processing of Data Transfer between Channel and I/O When the start processing of command to I/O has been completed, IFC 14 will immediately set CD(i)-CHREQ and issue a data transfer request to DTC-A 12 on "WRITE" command. On "READ" command, IFC 14 sets CD(i)CHREQ after having received data from I/O. When the preparatory processing for the data transfer has been completed at DTC-A 12, the multiplex control logic 1801 receives CD(i)CHREQ and the processing is executed in three stages under control of the stage control logic 1802 in the manner illustrated in FIG. 21A. In more particular, when CD(i)CHREQ is accepted by the multiplex control logic 1801, the control flip-flop 802 is set in the first machine cycle (stage) and at the same time the channel number as received is set at HCHAR 0-805. In this cycle, AI interface control logic 1803 sets DC(i) REQOK, while CCR-A control logic 1805 reads out CCR-A of the channel number as indicated by HCHAR$_o$, whereby the address of CBS 41 to which access is to be made is prepared from HCHAR$_o$ and CP. In the 0-th (zero-th) machine cycle, the contents of the control flip-flop 802 are shifted to the control flip-flop 803, while the contents of HCHAR 0-805 are shifted to HCHAR 1-806. What is executed in the first machine cyle is the updating of CCR-A and the read-out of data from CBS 41 on "WRITE" command or the processing required to store the data on CDBI-BUS in CBS 41 in "READ" command. The updating of the contents of CCC-A is effected by updating CP and subtracting 1 (one) from DATA COUNT. In the second machine cycle, the contents of the control flip-flop 803 are shifted to the control flip-flop 804, while the contents of HCHAR 1-806 are shifted to HCHAR 2-807. The processing executed in the second machine cycle resides in setting DC(i)TRNS from the AI interface control logic 1803 and setting the data read out from CBS 41 onto DCBOBUS to transfer to IFC 14.

The processing executed in three stages as described just above can be performed in an overlapped manner, as illustrated in FIG. 21B. More specifically, it is possible to selectively accept the processing request having the highest priority by one for every machine cycle among a plurality of processing requests appearing in the multiplex control logic 1801. Although plural processing requests are shown as generated in the cycles considerably close to one another in FIG. 21B to illustrate more clearly the overlapped processings, it will be appreciated that the processing requests are actually generated in the cycles more spaced from one another.

(2) Processing of Data Transfer with MS

When CCR-A control logic 1805 updates the contents of CCR-A 42 in the first stage, a decision is made on the basis of the updated value of CP whether it is necessary to execute data transfer with MS. If the result of that decision is affirmative, DR$_o$ bits are set in CCR-A 42 on "READ" command, to thereby indicate the presence of a data storage request to MS. On the other hand, when with the data transfer request on "WRITE" command, DR$_1$ bits are set in CCR-A 42. In response to the setting of DR$_o$ or DR$_1$ bits, AB interface control logic 1804 sets STSREQ(i). The processing in the case of DR$_1$ being set literally corresponds to the processing in the data transfer preparatory processing in which data transfer is executed to CBS 41 from MS in response to DR$_1$ being set, as described hereinbefore. In the case of DR$_o$ being set, when the setting of DR$_o$ bit is recognized from the contents of CCR-A after the reception of STSREQ(i) at DTC-B 13, CBS FEREQ is set and the data is read out from CBS 41 through the bus CBOBUS to be transferred to MS. Except for this operation, the processing is executed in the same manner as the processing in the case of DR$_1$ being set. After the data transfer to MS, DTC-B 13 updates the value of SP of CCR-A 42.

(3) Fetch Processing of IDAW

DTC-B 13 fetches the first IDAW and sets CF$_{0-2}$ to "001" in order to pre-fetch IDAW when SP of CCR-A 42 is set to the initial value thereof. Then, STSREQ(i) is set by DTC-A 12, and IDAW is fetched from MS by DTC-B 13 by using NEXT IDAW ADDRESS and KEY of CCR-B 51 and stored in CCR-B 51 at the area for NEXT IDAW. Subsequently, after the termination of data transfer with MS, the contents at the area NEXT IDAW are shifted to the area of DATA ADDRESS, when the updated value of DATA ADDRESS indicates the page boundary (i.e., the boundary at 2K bytes). Upon updating SP of CCR-A 42, the value of CF$_{0-2}$ is set to "001", thereby to allow the succeeding pre-fetch request for IDAW to be outputted from DTC-A 12.

(4) Data Chain Processing

Here, description will be made of the processing of data chain of "WRITE" command for which prefetch processing of CCW is executed. In the course of executing "WRITE" command having data chain indication, when the data fetch request for MS is determined to be the last one for executing the current CCW on the basis of the recognition that the residual data count is less than the number of bytes for data transfer with MS, DTC-B 13 sets CF$_{0-2}$ to "100" simultaneously with DR$_1$. Consequently, upon the completion of data fetch processing, DTC-A 12 again sets STSREQ(i) by virtue of CF$_{0-2}$ being "100", thereby to issue CCW fetch request to DTC-B 13 which thus fetches CCW from MS by using NEXT CCW ADDRESS and KEY in CCR-B 51. The flag of the pre-fetched CCW is stored at area PFFLAG of CCR-B 51, the DATA COUNT is stored at area PF DATA COUNT, and the data address is stored into area DATA ADDRESS if IDA of flag is equal to "0" or at area NEXT IDAW ADDRESS if IDA-1. Further, in the case of IDA=1, CF$_{0-2}$ in CCR-A 42 is set to "001" thereby to fetch the first IDAW.

On the other hand, when the result of updated DATA COUNT in CCR-A 42 becomes equal to "0" in the course of executing the data transfer between DTC-A 12 and IFC 14, DTC-A informs IFC$_{14}$ of the fact that the current data is the last one for the command having the data chain indication by setting DCCDT and DCCT$_{0-3}$ to "1" and "000". Consequently, IFC 14 sets CD(i)CHREQ upon transfer of the last data to I/O, and sets CDLDT upon reception of the last data by I/O, and informs DTC-A 12 of the fact that the last data has been transferred to I/O. Then, DTC-A 12 sets CCWCGREQ(i) thereby to indicate for DTC-B 13 that the data transfer of CCW having the data chain indication has been completed. Thereupon, DTC-B 13 shifts PFFLAG to FLAG in CCR-B 51 and initializes CCR-A 42 to thereby initiate the execution of the chained CCW.

(5) Sequence Control for Pre-fetch Processings for Plural Items

The requests for data transfer from MS, fetchings of IDAW and CCW except for the data transfer request to MS for the "READ" command are all previously processed before the data or information is actually needed, and there is a possibility that a plurality of items are issued simultaneously. Under such condition, control for arranging the proper processing sequence is made possible by the control bits of CF$_{0-2}$ and NIDAWW, CADRW, DADRW and FNIDAW in CCR-A 42.

In the following, description will be made in detail about these control bits. In this connection, it should be mentioned that the control bits are not necessarily required to be present at CCR-A 42 but may be stored at any place so far as access to these bits in common from DTC-A 12 and DTC-B 13 are allowed.

O-O-3: NIDAWW (Next IDAW Wait)

These bits are set when there arises conflict between the fetch request for IDAW set upon transferring the data having indication of IDA and the fetch/store request for the data. In other words, this applies to the case in which although the conditions for executing the fetch/store of data have been accomplished, the data address to be used in this execution is indicated by the succeeding or Next IDAW the fetch operation of which is not yet completed. In such case, request for fetch/store of data has to be again generated when the fetch operation of the Next IDAW has been completed. These bits are used for storing this fact.

By way of example, it is assumed that the data address indicated by a First IDAW begins at a location one byte before the page boundary. On such assumption, when the fetch of the First IDAW has been executed, a first data fetch request is first issued before executing the fetch of the Next IDAW. Since the valid data among the fetched ones amounts only to one byte, it will be tried to issue successively the next data fetch request. However, the address to be used therefor can not be determined unless the Next IDAW is fetched, because the page boundary has been passed over. At this time, however, the fetch of the Next IDAW has not yet been completed. Accordingly, the setting of the data fetch request is temporally suspended, while the bits off NIDAWW are set, and the fetch operation for the Next IDAW is executed in precedence. After the completion of this fetch operation, the fetch request for data is issued again.

O-O-4: CADRW (Control AdDRess Wait)

CADRW may be set when IDA and the chain data are simultaneously indicated. More particularly, when the Next CCW is tried to be fetched in accordance with the indication of the data chain, the CCW fetch request is not allowed to be issued, unless the preceding fetch operation of the Next IDAW has been completed. Under such condition, these bits of CADRW are set thereby to allow the fetch request for CCW to be issued again upon completion of the fetch operation of the Next IDAW.

O-O-5: DADRW (Data AdDRess Wait)

DADRW may be set when data having IDA indication is transferred. A Next IDAW issuing currently the fetch request consists of those bits which have to be stored in the field of the data address of CCR-B, when the Next IDAW is fetched.

Usually, the Next IDAW as fetched is stored in CCR-B at the area for the Next IDAW and shifted to the field of the data address when the data address has reached the page boundary. However, if the fetch of the Next IDAW has not yet been completed at that time, the Next IDAW as fetched has to be immediately used as the data address. These bits are used to this end.

O-O-6: FNIDAW (Fetch Next IDAW)

FNIDAW is used in the data chain operation of the "WRITE" type having an IDA indication. In the case of the data chain of "WRITE" command, the next CCW is pre-fetched before the data transfer by CCW being currently executed has been terminated. Such pre-fetch is executed when the data address designated by current CCW in CCR-B 51 is no more used (i.e. after the termination of the last data fetch by current CCW). When IDA is designated by the pre-fetched CCW, the fetch is executed up to the first IDAW.

The flows of processings described above are illustrated in FIG. 22, in which CHSAR denotes an address register for MS and SDIR denotes a data register in which the data transferred from MS is set. Both of these registers are provided in MS interface control logic 1906 shown in FIG. 20.

When a further Next IDAW is successively to be fetched, there is available no area in CCR-B51 at which the fetched Next IDAW can be stored, as can be seen from FIG. 22. Inherently, the fetched Next IDAW may be loaded in the area "Next CCW ADR+8" shown in FIG. 22. However, this area is currently busy due to the data chain being executed. Consequently, data transfer of CCW currently being executed is continued to the end and "Next CCW ADR+8" is replaced by "current CCW ADR+8", whereby the fetch of the Next IDAW is executed after the area "Next CCW ADR+8" becomes idle.

FNIDAW is used for storage to effect the fetch of Next IDAW after the control is switched to the next CCW.

0-1-4 $CF_0$ (Control Fetch 0)
0-1-5 $CF_1$ (Control Fetch 1)
0-1-6 $CF_2$ (Control Fetch 2)

Three bits of $CF_0$, $CF_1$ and $CF_2$ are encoded to store the type of the fetch request issued to DTC-B 13 from DTC-A 12. They may be also used as bits to store the results (normality or abnormality) of the fetch operation.

| $CF_0$ | $CF_1$ | $CF_2$ | Meanings |
|---|---|---|---|
| 0 | 0 | 0 | : No action |
| 0 | 0 | 1 | : Fetch request for Next IDAW is issued. |
| 0 | 1 | 0 | : Pre-fetching of CCW in data chain of "WRITE" type command has been completed. When indications of TIC and IDA are present, it is meant that the fetching of data address has been also completed. |
| 0 | 1 | 1 | : Fetch request for First IDAW is issued. |
| 1 | 0 | 0 | : Fetch request for CCW data chain is present. |
| 1 | 0 | 1 | : Presence of abnormality in pre-fetched Next IDAW (in respect of program check or the like) is indicated. |
| 1 | 1 | 0 | : Because CCW fetched for data chain has been found to be TIC, fetch request for CCW addressed by TIC is issued. |
| 1 | 1 | 1 | : Abnormality (in respect of program check or the like) has been found in the fetch requests by $CR_{0,1,2}$ = "011", "100", "110", respectively. |

Next, description will be made on the timing for issuing the various fetch requests described above. In the following, $CF_{0,1,2}$="001" will be represented in a simplified form CF 001. Same applies to other bit combinations.

CF001

The timing for issuing fetch request for Next IDAW is as follows:

(1) At the time when fetch operation of the First IDAW has been normally completed. In this connection, it is to be noted that Next IDAW of the next or succeeding CCW for the chain data of "WRITE" type command is fetched after the data transfer of the current CCW has been completely executed. Reference is to be made on the description about FNIDAW.

(2) At the time when the last data of a page (2K bytes) has been fetched and stored in the course of executing "WRITE"/"READ" commands having IDA indication, that is, when the address of the request issued to MS is represented as follows:

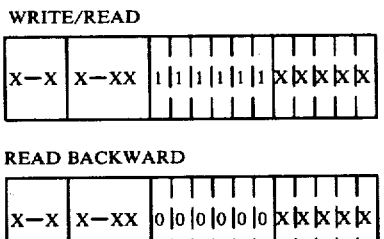

The Next IDAW as fetched is IDAW which indicates the page after the next page. (Note: IDW indicating the next page is pre-fetched and loaded in CCR-B.

(3) At the time when the data transfer by current CCW has been completely executed with FNIDAW being equal to "1". Refer to the first paragraph (1) and the description about FNIDAW.

(4) At the time when the fetch of Next IDAW has been normally completed with DADRW being equal to "1". In the case where DADRW="1", Next IDAW as fetched can be used immediately as data address and thus a further Next IDAW may be fetched.

The processing flow for CF 001 is illustrated in FIG. 23.

CF 011

The timing conditions for issuing the fetch request for First IDAW are satisfied when no abnormality in respect of program check or the like for the fetched CCW has been found, the command is not TIC and that the flag of IDA is equal to "1".

Figure 24:
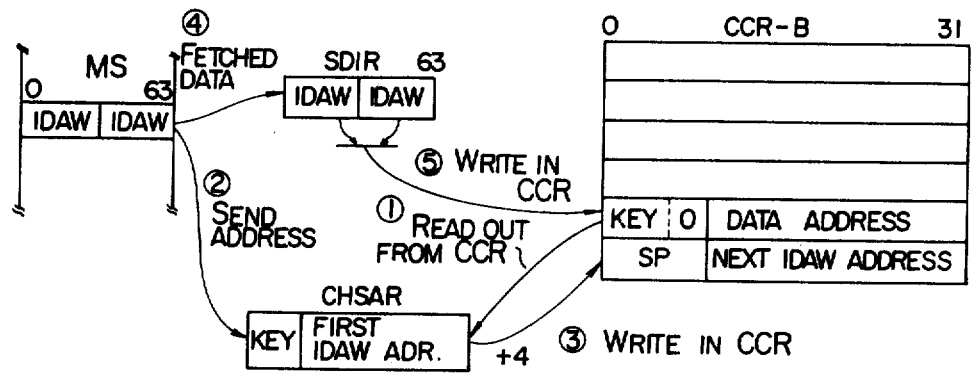
FIG. 24 illustrates processing for fetching First IDAW.

CCR-A 42 and CCR-B 51 of DTC-B 13 are initialized in accordance with the contents of the fetched IDAW. The relevant processing flow is illustrated in FIG. 24.

CF 100

The timing for issuing the fetch request for CCW for the data chain varies in dependence on whether the command in concern is of a type of "WRITE" or "READ" operations.

(a) In the case of the command relating to "WRITE" the pre-fetch request has to be issued after the completion of the last data fetch for the current CCW. Otherwise, data address field of CCR-B 51 is replaced by the data address of the pre-fetched CCW.

Figure 25:
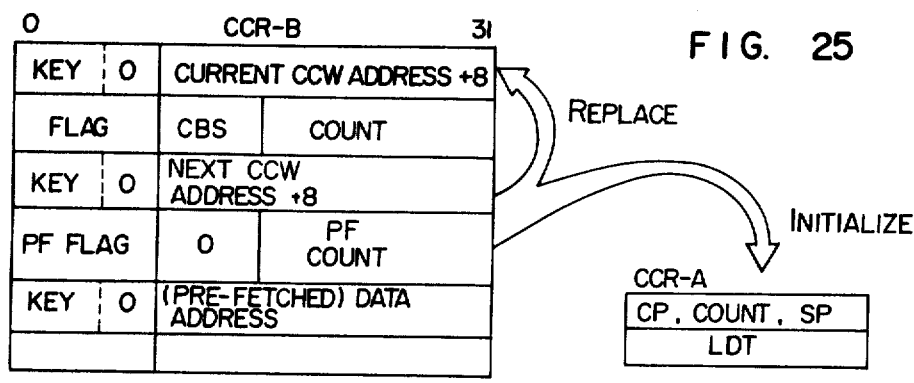
FIG. 25 illustrates processing requests for initializations of CCR-A and CCR-B for execution of data chain.

The pre-fetched CCW is stored in CCR-B 51 at the pre-fetch area thereof. When the data transfer of the current CCW has been completely executed (the last data has been transferred to I/O), the replacement in CCR-B 51 and initialization of CCR-A 42 are effected. However, the data address is entered at the area where data of the current CCW has been originally loaded. The relevant processing flow is illustrated in FIG. 25.

When the pre-fetched CCW is TIC, CF 110 is set and the fetch request for CCW addressed by TIC is issued.

Figure 26:
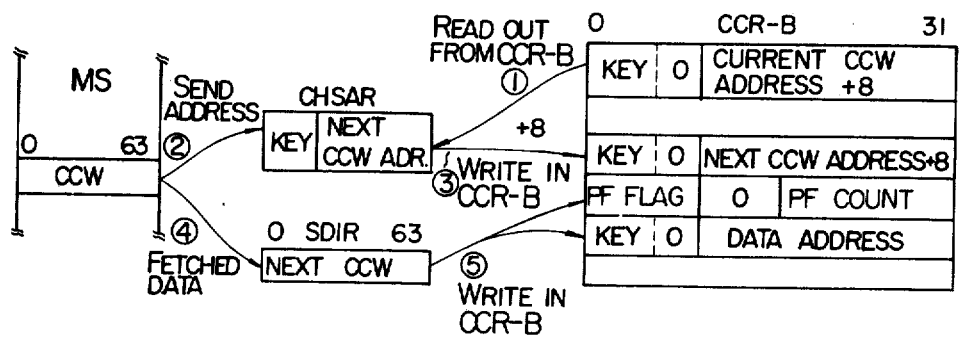
FIG. 26 illustrates processing to fetch CCW upon execution of data chain.

When IDA is indicated for the pre-fetched CCW, CF 011 is set and the fetch request for First IDAW is issued. The processing flow for CF 100 is illustrated in FIG. 26 on the assumption that the next CCW is not TIC.

Figure 27:
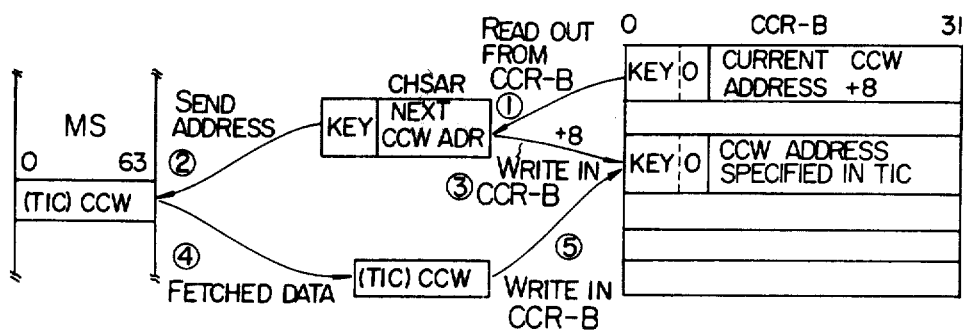
FIG. 27 illustrates processing TIC for execution of data chain of a type of "WRITE" operations.

The processing flow in the case where the next CCW is also TIC is illustrated in FIG. 27.

(b) For the command of "READ"

Pre-fetch of CCW is not executed for the command of a type of "READ" operations. After the last data for the current CCW has been received (i.e., when the residual byte count becomes equal to zero), the fetch request for CCW is sent out.

Until the fetching of CCW has been completed, acceptance of data transfer request signal CD(i)CHREQ to DTC-A 12 from IFC 14 is inhibited. When the next CCW is TIC or IDA is indicated, acceptance of CD(i)-CHREQ is delayed until the fetching of data address has been completed.

When the fetched CCW is TIC, CF 110 is detected and the fetch request for CCW addressed by TIC is issued. When IDA is designated, CF 011 is set and the fetch request for First IDAW is issued.

CF 110

When CCW fetched by data chain is TIC, value of CF is set to "110" and CCW addressed by TIC is fetched.

In the case where the CCW addressed by the TIC is again TIC, program check is executed.

When IDA is indicated for the CCW addressed by TIC, CF 011 is set and the request for First IDAW is issued.

Figure 28:
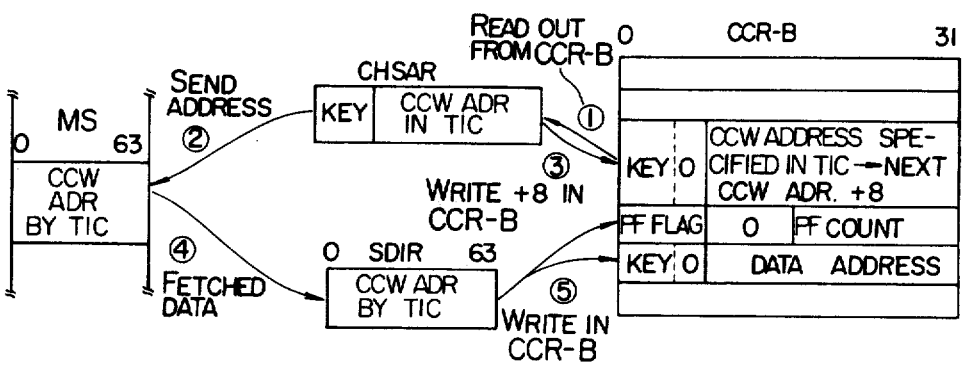
FIG. 28 illustrates processing TIC for execution of data chain of a type of "READ" operations.

The processing flow for CF 110 is illustrated in FIG. 28.

1 (vi) Processing For Terminating Command (1) Processing for terminating data transfer:

When the residual data count zero is detected in the course of execution of CCW having no indication of data chain in DTC-A 12, DCCDT is set to "0" with DCCT$_{0-3}$ being set to "000", whereby the indication of termination is supplied to IFC 14, which will then supply an indication of command termination to I/O for the data transfer request therefrom after the last data has been supplied to I/O. In response to the command terminated indication, I/O informs IFC 14 of the status of I/O at the termination of command. IFC 14 will set CD(i)CHREQ for DTC-A 12 and then set CDLDX when CD(i)CHREQ is accepted. DTC-A 12 in turn sets CTSREQ(i), whereby DATA COUNT at CCR-A 42 is shifted to DATA COUNT area in CCR-B 51 at DTC-B 13 while PFCSB in CCR-B 51 is shifted to CSB. Thereafter, DTC-B 13 sends back CTSTACPT(i) to DTC-A 12 which in turn sends DC(i)CCWINV to IFC 14 which then sets CQ(i)CHINT for MC 11. When MC 11 accepts CQ(i)CHINT, the command termination processing is entered. The above description concerns the procesing for terminating the data transfer starting from the channel. When the data transfer processing is to be terminated starting from I/O, information about the command termination is available from I/O before the residual data count in DTC-A 12 becomes equal to zero. In this case, CDLDX is informed from IFC 14 without waiting for the indication of DCCT$_{0-3}$ being equal to "000" from DTC-A 12. Succeeding processing is executed in the same manner as is in the case of terminating the command starting from the channel.

(2) Processing for terminating command:

For terminating the command, MC 11 reads-out from DTC-B 13 KEY, NEXT CCW ADDRESS, FLAG, CSB and DATA COUNT of CCR-B 51. When no indication of command chain is present, CSW is prepared and stored in SBCR 33, whereupon an interrupt request is issued to CPU. In the case where the indication of command chain is present, confirmation is made as to absence of error and the contents of DSB being "1" for both the channel end and the device end; and subsequently command chain processing is executed by making use of CCW address read out from CCR-B 51. When the contents of DSB are "1" only for the channel end, the status such that the device end of the command chain is being waited is set at USQC of SBCR 33, and at the same same time CCW address from CCR-B 51 is stored at the area NEXT CCW ADDRESS of SBCR, whereby the command termination processing comes to an end.

(vii) Processing For Failures

Because of the fact that the channel operation is processed independently by a plurality of control units, it is necessary to terminate the command in the various controls at proper timing in a proper sequence, particularly when failure is detected in the course of executing the pre-fetch processings. In the following, description will be made in connection with the failure detected in the processings relating to MS which is particularly difficult to be dealt with.

When a failure is detected in the processings relating to MS at DTC-B 13, the contents thereof is set at PFCSB of CCR-B 51 and the same time CRAREQ are set by AB interface control logic 1904 while the type of the failure is set by using SRF bits in CCR-A 42. DTC-A determines the contents of SRF bits and allows DCCKHLT to be issued to IFC 14 from AI interface control logic 1803 at a proper time, thereby to indicate the termination of command. The succeeding command termination processings are executed in the same manner as the normal case, DTC-B 13 validates the failure information by shifting PFCSB of CCR-B 51 to CSB in the processing of CTSTREQ(i) from DTC-A 12. In the following, detailed description will be made SRF bits in CCR-A 42 and the signal DCCKHLT of AI interface control logic 1803. Definition is made as follows:

0-1-0: $SRF_0$
0-1-1: $SRF_1$

The abnormal condition detected in the processings relative to MS is stored in CCR-A at SRF. The term "abnormal condition" as herein used is intended to encompass the abnormality in context of hardwares such as parity checks of data and address as well as the abnormality in context of softwares such as program check, storage protecting check or the like executed in conjunction with the fetching of IDAW and CCW.

There are varieties of abnormal conditions. Those which are detected in conjunction with the pre-fetch requests for Next IDAW, Next CCW and Next data are not immediately validated, while others which are detected in connection with the store of data or the like is immediately validated. Accordingly, duration in which data transfer is stopped will vary in dependence on the types of failures.

The controls for handling the abnormal conditions described above are effected through combinations of $SRF_0$ and $SRF_1$ as follows:

(a) Only $SRF_0$ is set:
Abnormal condition is found in the fetched IDAW which is intended to be used as the data address for executing the fetch request for the next data.

Thus, the issue of the fetch request for the next data is suspended, and the abnormal condition is validated at the time when current data in CBS 41 has all been sent out to I/O, thereby to stop the transfer operation.

(b) Only $SRF_1$ is set:
Abnormal condition is found in conjunction with with the data pre-fetch request.

Subsequent issue of the data fetch requests is suppressed and the abnormal condition is validated at the time when current data in CBS 41 has all been sent out to I/O, thereby to stop the transfer operation.

(c) Both of $SRF_0$ and $SRF_1$ are set:
Abnormal condition which has to be instantly validated is detected, or the time has come when the abnormal condition caused by the prefetch request has to be validated.

Under this status, DCCKHLT indication is issued in response to the reception of CD(i)CHREQ. In more detail, the conditions for the settings are as follows:

(1) Abnormal condition was detected in connection with the data store request.

(2) Abnormal condition was detected in the fetch request for CCW by First IDAW and chain data in the course of executing a "READ" command.

(3) When abnormal condition was detected in the fetch request for CCW by First IDAW and chain data, these informations had been already in the state to be immediately utilized.

(4) When abnormal condition was detected in the fetch request for data, CBS 41 has been already vacant, waiting for the fetch of that data.

(5) Abnormal condition was found in conjunction with Next IDAW for "READ" command and the time has come when the next data store calls for this new IDAW.

(6) Abnormal conditions at the time of pre-fetching CCW, IDAW and Data were validated. The time has come when these informations are to be used.

DCCKHLT

When the abnormal condition detected in the interfaces with MS including both the abnormal conditions in context with hardwares such as parity error and in context with the softwares such as program check and storage protecting check is validated, DCCKHLT indication is issued to IFC 14 to terminate the data transfer operation currently being executed. Upon reception of DCCKHLT, IFC 14 instructs I/O to terminate the command. Further, detection of abnormal condition is informed to MC 11. The contents of abnormal condition is stored in CBS 41 of CCR-A 42.

The time at which the abnormal condition is made valid corresponds to the time at which both bits of $SRF_0$ and $SRF_1$ in CCR-A 42 become "1".

DCCKHLT is valid only for IFC 14 received DC(i)TRNS through multiplex line.

(viii) Synchronizing Operation

Since a series of operations executed in the single channel are processed by a plurality of the various control units or controllers according to the teachings of this invention, it becomes necessary to synchronize the operations in the same channel among the control units or controllers in the sense to match the phases of processing among the controllers. Now, the synchronizing controls fragmentally described hereinbefore will be summarized below.

(a) When preparatory processing for data transfer at DTC-B upon shift from command initiation to data transfer, execution of data chain or the like is not in time, reception of CDCHREQ(i) of the corresponding channel by the control logic 811 is inhibited.

(b) When a plurality of requests such as request from DTC-A 12 to DTC-B 13 for data transfer with MS, IDAW fetch request, CCW fetch request upon execution of data chain and so forth are issued in the same channel, then sequence control is made possible with the aids of control bits such as $DR_{0-1}$, $CF_{0-2}$, NIDAWW, CADRW, DADRW, FNIDAW and so forth in CCR-A 42.

(c) Failure detected at DTC-B 13 is stored in CCR-A 42 of DTC-A 12 by using the bits $SRF_{0-1}$, and when the failure is validated. DCCKHLT signal is sent to IFC 14 from DTC-A 12 thereby to stop the data transfer.

(d) In the case of executing the data chain, the last data of current CCW is transferred to I/O, while the signal CDLDT is sent to DTC-A 12, whereby the CCWCGREQ(i) signal is issued from DTC-A 12 to DTC-B 13, to request the replacement of the prefetched CCW in CCR-B 51 by current CCW.

(e) Upon termination of command, the CDLDX signal is sent to DTC-A 12 from IFC 14. After the residual data in CBS 41 is processed by DTC-A 12, CTSTREQ(i) is issued to DTC-B 13 to thereby allow the residual data count to be shifted from CCR-A 42 to CCR-B 51, and subsequently the DC(i)CCWINV signal is issued to IFC 14 from DTC-A 12, thereby to allow the signal CQ(i)CHINT to be sent to MC 11 from IFC 14 which thus issues the request for command termination to MC 11.

For processing the command termination, MC 11 reads out KEY, NEXT CCW ADDRESS, FLAG, CSB, DATA COUNT from CCR-B 51 through DTC-B 13. When no indication of command chain is present, CSW is prepared and stored in SBCR 33 and interruption request is issued to CPU. On the other hand, in the case where the indication of command is present, the command chain is executed by using CCW address read out from CCR-B 51 after having determined that no error appears and that the content of DSB is "1" for both the channel end and device end. When the content of DSB is "1" only for the channel end, the status waiting the device end is set at USQC of SBCR 33, while CCW address from CCR-B 51 is stored at the area NEXT CCW ADDRESS of SBCR to terminate the processing.

As will be appreciated, this invention has now provided a channel control system for controlling in common a plurality of channels, wherein the processings executed heretofore by the microprogram control such as control for data transfer with MS, control of data chain, control of IDA or the like which takes place at a relatively low frequency but require a high-speed processing to assure the requirement of concurrency between the data transfer and the processing are executed by independent and common hardware controllers.

According to this invention, degradation in performance due to increase in number of channel to be controlled and enhanced operation speed of I/O can be positively prevented.

What we claim is:

1. A channel control system for controlling data transfer through a plurality of channels, comprising:
   channel data buffer storage means having a plurality of storage positions for storing data transferred through said channels, each of said storage positions storing data for each of said channels;
   channel control register means having a plurality of storage positions for storing data transfer control information, each of said storage positions storing data transfer control information for each of said channels;
   selection means for accepting selectively one of a plurality of data transfer requests in said channels and for issuing the number identifying the accepted channel;
   stage control means including series-connected stage control units for performing simultaneously separated processings for different channels, wherein said channel identifying number issued from said selection means is received at the first one of said stage control units and control operation is shifted sequentially from the first one to the last one of said stage control units;
   channel control register control means for making reference to and updating the contents of said channel control register means in response to the channel identifying number from at least one of said control units;
   channel data buffer storage control means for performing read-out/write-in operations of data for said channel data buffer storage means in response to the channel identifying number from at least one of said stage control units; and
   means for performing data transfer with said channel data buffer storage control means in response to the channel identifying number from at least one of said stage control units.

2. A channel control system as set forth in claim 1, wherein said selection means includes means for accepting one of data transfer requests in each machine cycle, and said stage control means includes means for shifting the channel identifying number from one stage control unit to the next stage control unit in each machine cycle.

3. A channel control system for controlling data transfers through a plurality of channels, comprising:
   channel data buffer storage means having a plurality of storage positions for storing data transferred through said channels, each of said storage positions storing data for each of said channels;
   channel control register means having a plurality of storage positions for storing data transfer control information, each of said storage positions storing data transfer control information for each of said channels;
   means for accepting selectively the data transfer request allotted with the highest priority among the requests from said plurality of channels and issuing the number identifying the accepted channel;
   stage control means including first, second and third stage control units for performing separated processings for different channels, wherein said channel identifying number issued from said accepting means is received at said first stage control unit and control operation is shifted sequentially from said first stage control unit to said second stage control unit and from said second stage control unit to said third stage control unit;
   channel control register control means for preparing an address for said channel data buffer storage in accordance with the contents in said channel control register corresponding to the channel identifying number issued from said first stage control unit, and updating the contents in said channel control register corresponding to the channel identifying number available from said second stage control unit;
   channel data buffer storage control means for performing read-out/write-in operations of data for said channel data buffer storage in accordance with the address available from said channel control register control means in response to the channel identifying number issued from said second stage control unit; and means for performing the data transfer for said channel data buffer storage means in response to the channel identifying number from said third stage control unit.

4. A channel control system for performing data transfers between a main storage and input/output devices through a plurality of channels, comprising:

a channel data buffer storage for storing data in one-to-one corresponding relation to each of said channels;

a channel control register for storing data transfer control information in one-to-one corresponding relation to each of said channels;

first accepting means for accepting selectively one of data transfer requests from said plurality of channels;

means for inhibiting the reception of said data transfer request at said first accepting means separately for each of said channels;

second accepting means for accepting access requests to said channel data buffer register and said channel control register;

means for inhibiting the reception of said data transfer request at said first accepting means in response to the signal output from said second accepting means;

stage control means for dividing the processing for the data transfer request accepted by said first accepting means into a plurality of processing stages to thereby effect the processing for the different channels separately at said divided individual stages; and means for performing read-out/write-in operations for said channel data buffer storage and said channel control register in response to the outputs from the individual stages of said stage control means and the output from said second accepting means.

5. A channel control system as set forth in claim 4, further comprising means for performing data transfer with said read-out/write-in operation performing means in response to outputs from said stage control means.

* * * * *